US012266947B2

United States Patent
Abiri et al.

(10) Patent No.: US 12,266,947 B2
(45) Date of Patent: Apr. 1, 2025

(54) ADAPTIVE ROAMING AND ARTICULATING GENERATING UNIT FOR WIRELESS POWER TRANSFER

(71) Applicant: GuRu Wireless, Inc., Pasadena, CA (US)

(72) Inventors: Behrooz Abiri, Pasadena, CA (US); Seyed A. Hajimiri, Pasadena, CA (US); Florian Bohn, Pasadena, CA (US); Artsroun Darbinian, Pasadena, CA (US); Dan Sturm, Pasadena, CA (US); Farhud Tebbi, Pasadena, CA (US)

(73) Assignee: GuRu Wireless, Inc., Pasadena, CA (US)

( * ) Notice: Subject to any disclaimer, the term of this patent is extended or adjusted under 35 U.S.C. 154(b) by 0 days.

(21) Appl. No.: 17/129,880

(22) Filed: Dec. 21, 2020

(65) Prior Publication Data

US 2021/0234408 A1 Jul. 29, 2021
US 2024/0097498 A9 Mar. 21, 2024

Related U.S. Application Data

(63) Continuation-in-part of application No. 16/853,542, filed on Apr. 20, 2020, now abandoned.
(Continued)

(51) Int. Cl.
*H02J 50/70* (2016.01)
*H02J 50/00* (2016.01)
(Continued)

(52) U.S. Cl.
CPC ............ *H02J 50/30* (2016.02); *H02J 50/005* (2020.01); *G01S 17/86* (2020.01); *G01S 19/421* (2013.01)

(58) Field of Classification Search
CPC .................................. H02J 50/30; H02J 50/12
See application file for complete search history.

(56) References Cited

U.S. PATENT DOCUMENTS 1,119,732 A * 12/1914 Tesla ...................... H01Q 1/38
343/908
4,493,085 A * 1/1985 Valley ..................... H01S 3/101
372/24
(Continued)

FOREIGN PATENT DOCUMENTS

CN 103947081 A 7/2014
CN 104302218 A 1/2015
(Continued)

OTHER PUBLICATIONS

PCT/US2020/029000 International Search Report and Written Opinion dated Sep. 10, 2020.
(Continued)

*Primary Examiner* — Adam D Houston
(74) *Attorney, Agent, or Firm* — Weaver Austin Villeneuve & Sampson LLP

(57) ABSTRACT

A roaming and articulating wireless power delivery device includes, in part, an optical assembly adapted to deliver an optical beam, an energy storage unit, a controller, and an electrically driven moving platform. The moving platform may include an inertia measurement, a GPS, bump sensors and proximity sensors. The device may further include a camera, a gradient filter, and a wireless communication link via which the device establishes a two-way communication with a recovery unit being wirelessly powered.

22 Claims, 25 Drawing Sheets

Related U.S. Application Data

(60) Provisional application No. 62/952,073, filed on Dec. 20, 2019, provisional application No. 62/937,917, filed on Nov. 20, 2019, provisional application No. 62/848,506, filed on May 15, 2019, provisional application No. 62/836,320, filed on Apr. 19, 2019.

(51) Int. Cl.
  *H02J 50/30* (2016.01)
  *G01S 17/86* (2020.01)
  *G01S 19/42* (2010.01)

(56) References Cited

U.S. PATENT DOCUMENTS

| | | | |
|---|---|---|---|
| 6,407,535 B1 * | 6/2002 | Friedman | B64G 1/428 244/1 R |
| 6,534,705 B2 * | 3/2003 | Berrios | F03H 3/00 323/221 |
| 6,764,373 B1 | 7/2004 | Osawa et al. | |
| 6,764,378 B2 | 7/2004 | Osawa et al. | |
| 7,423,767 B2 | 9/2008 | Steinsiek et al. | |
| 7,532,657 B2 | 5/2009 | Ishizu | |
| 8,168,930 B2 * | 5/2012 | Hyde | H02J 50/20 455/343.1 |
| 8,835,823 B2 * | 9/2014 | Hyde | H02J 50/40 250/201.1 |
| 9,742,223 B2 * | 8/2017 | Mor | H02J 50/30 |
| 10,155,586 B2 * | 12/2018 | Liu | B64C 39/024 |
| 10,211,674 B1 | 2/2019 | Leabman et al. | |
| 10,575,198 B1 | 2/2020 | Dash et al. | |
| 10,587,152 B2 | 3/2020 | Abiri et al. | |
| 10,770,926 B2 * | 9/2020 | Olsson | H02J 50/20 |
| 11,201,505 B2 * | 12/2021 | Mor | H04B 10/807 |
| 11,757,308 B2 | 9/2023 | Abiri et al. | |
| 2002/0060993 A1 | 5/2002 | Dent | |
| 2007/0032951 A1 | 2/2007 | Tanenhaus et al. | |
| 2008/0007203 A1 | 1/2008 | Cohen et al. | |
| 2009/0103925 A1 * | 4/2009 | Alpert | H04B 10/807 398/130 |
| 2009/0128401 A1 | 5/2009 | Perry et al. | |
| 2009/0278728 A1 | 11/2009 | Morgan et al. | |
| 2013/0293417 A1 | 11/2013 | Tong et al. | |
| 2014/0092929 A1 | 4/2014 | Alpert et al. | |
| 2014/0126603 A1 * | 5/2014 | Della-Pergola | H01S 3/08 372/96 |
| 2014/0175893 A1 | 6/2014 | Sengupta et al. | |
| 2014/0188325 A1 | 7/2014 | Johnson et al. | |
| 2015/0069831 A1 | 3/2015 | Kesler et al. | |
| 2015/0186701 A1 | 7/2015 | Otis et al. | |
| 2016/0099758 A1 | 4/2016 | Bell et al. | |
| 2016/0126753 A1 | 5/2016 | Wight et al. | |
| 2016/0134370 A1 | 5/2016 | Huang et al. | |
| 2016/0190872 A1 | 6/2016 | Bohn et al. | |
| 2017/0018976 A1 * | 1/2017 | Mor | H02J 50/40 |
| 2017/0080815 A1 | 3/2017 | Wechsler et al. | |
| 2017/0346347 A1 | 11/2017 | Abiri et al. | |
| 2019/0044390 A1 | 2/2019 | Hajimiri et al. | |
| 2019/0363578 A1 | 11/2019 | Hume et al. | |
| 2020/0161889 A1 | 5/2020 | Lan | |
| 2020/0177026 A1 | 6/2020 | Sosinov et al. | |
| 2020/0227949 A1 | 7/2020 | Abiri et al. | |
| 2020/0389057 A1 | 12/2020 | Hajimiri et al. | |
| 2021/0234408 A1 * | 7/2021 | Abiri | B60L 53/36 |
| 2022/0123601 A1 * | 4/2022 | Alpert | H02J 50/40 |
| 2025/0030276 A1 | 1/2025 | Hajimiri et al. | |

FOREIGN PATENT DOCUMENTS

| | | | |
|---|---|---|---|
| CN | 104885333 A | 9/2015 | |
| CN | 105873791 A | 8/2016 | |
| CN | 107078561 A | 8/2017 | |
| CN | 109195827 A | 1/2019 | |
| CN | 111162569 A | 5/2020 | |
| JP | 2015100230 A | 5/2015 | |
| KR | 102320002 B1 * | 11/2021 | |
| WO | WO-2007036937 A2 * | 4/2007 | H04B 10/1123 |
| WO | WO-2009083990 A2 * | 7/2009 | H01S 3/005 |
| WO | WO-2014021636 A1 | 2/2014 | |
| WO | WO-2014075103 A1 | 5/2014 | |
| WO | 2017/205549 | 11/2017 | |
| WO | WO 2017/209735 A1 | 12/2017 | |
| WO | WO 2020/215082 A1 | 10/2020 | |
| WO | WO-2022011479 A1 * | 1/2022 | B33Y 30/00 |

OTHER PUBLICATIONS

Unbox therapy, I found a great Apple AirPower Alternative, Source: www.youtube.com Apr. 4, 2019, retrieved on Jul. 27, 2020 from <https://www.youtube.com/watch?v=KGSyNYskSWU. entire video.
International Preliminary Report on Patentability dated Oct. 28, 2021, in application No. PCT/US2020/029000.
U.S. Restriction Requirement dated Mar. 25, 2022, in U.S. Appl. No. 16/853,542.
U.S. Non-Final Office Action dated Jul. 21, 2023, in U.S. Appl. No. 16/853,542.
CN Office Action dated Feb. 18, 2024 in CN Application No. 202080040467.2 with English translation.
US Office Action dated Apr. 3, 2019 in U.S. Appl. No. 15/604,587.
US Notice of Allowance dated Feb. 19, 2020 in U.S. Appl. No. 15/604,587.
International Preliminary Report on Patentability mailed Dec. 6, 2018 in PCT Application No. PCT/US2017/034342.
International Search Report and Written Opinion (ISA/US) Jan. 5, 2018 in PCT Application No. PCT/US2017/034342.
US Office Action dated May 11, 2021 in U.S. Appl. No. 16/776,482.
US Office Action dated Oct. 27, 2022 in U.S. Appl. No. 16/776,482.
US Final Office Action dated Mar. 30, 2022 in U.S. Appl. No. 16/776,482.
US Notice of Allowance dated Apr. 27, 2023 in U.S. Appl. No. 16/776,482.
CN Office Action dated Aug. 28, 2024 in CN Application No. 202080040467.2 with English translation.
U.S. Final Office Action dated Jul. 11, 2024, in U.S. Appl. No. 16/853,542.
CN Notice of Allowance dated Dec. 11, 2024 in CN Application No. 202080040467.2, with English translation.
KR Office Action dated Dec. 4, 2024 in KR Application No. 10-2021-7037039 with English Translation.

* cited by examiner

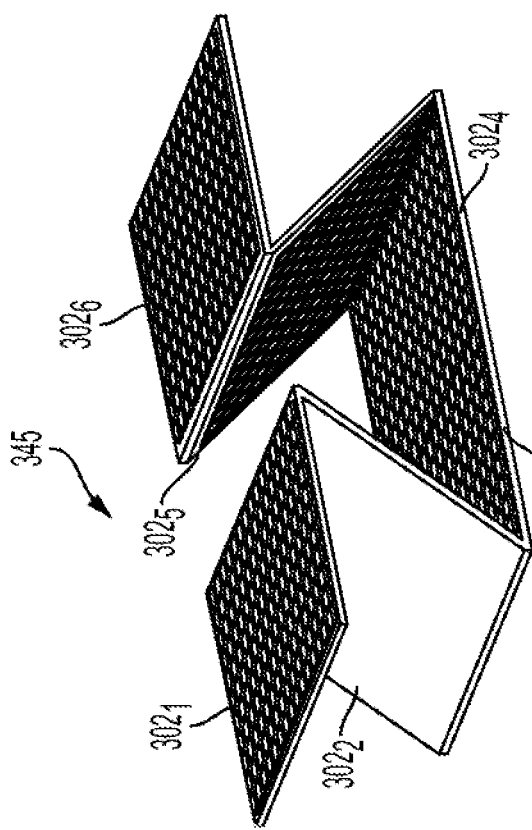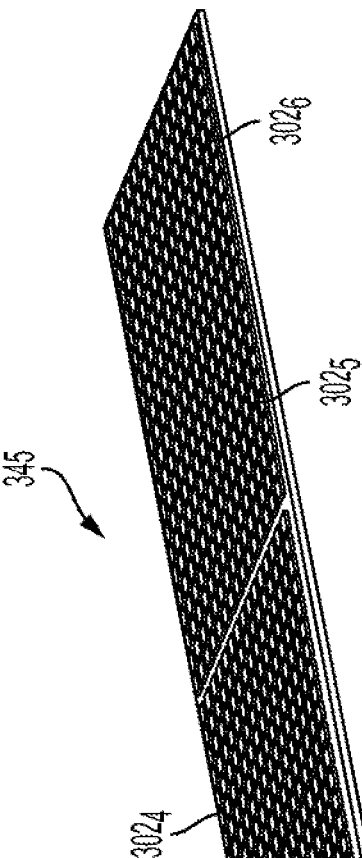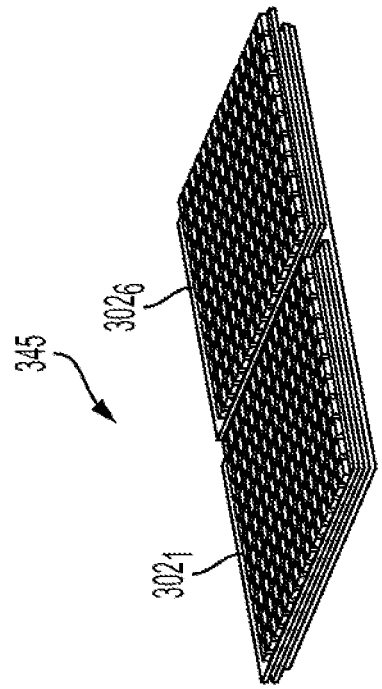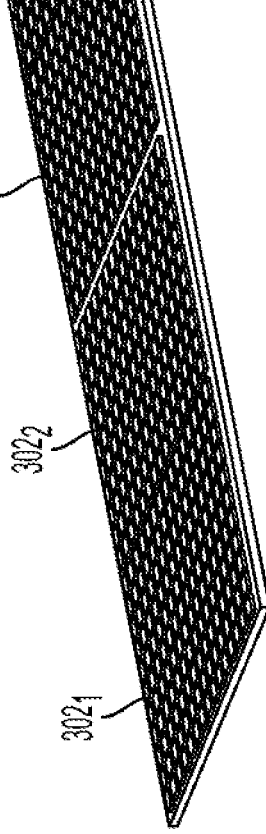

ADAPTIVE ROAMING AND ARTICULATING GENERATING UNIT FOR WIRELESS POWER TRANSFER

CROSS REFERENCE TO RELATED APPLICATIONS

The present application is a continuation-in-part of U.S. application Ser. No. 16/853,542, filed on Apr. 20, 2020.

The present application also claims benefit under 35 USC 119(e) of Application Ser. No. 62/952,073, filed Dec. 20, 2020, the content of which is incorporated herein by reference in their entirety.

The present application incorporates by reference U.S. Pat. No. 10,587,152, issued on Mar. 10, 2020, entitled "Laser Wireless Power Transfer System with Active and Passive Safety Measures" in its entirety.

FIELD OF THE INVENTION

The present invention relates to wireless power delivery, and more particularly, to a mobile power delivery method and system.

BACKGROUND OF THE INVENTION

Non-proximity wireless power transmission through the use of radio frequency (RF) and mm-wave beam forming and focusing enables and enhances a plethora of new applications. For example, the proliferation of internet of things (IoT) devices and sensors can be substantially accelerated by delivering power to them wirelessly and eliminating the wiring that would otherwise be required during their installation.

Another example of wireless power transmission is wireless charging of portable personal devices, such as smart phones and tablets. Charging such devices wirelessly will enhance their usability and reduce the need for carrying portable batteries. In addition, many other electronic devices ranging from wireless mouse and keyboards to thermostats and security sensors and cameras can benefit from wireless power transfer.

A wireless power generation unit (GU) may include multiple RF sources and antennas, as well as other components, such as a processing unit, interface circuitry, communication circuitry, and the like. An RF energy focal point can be formed at a desired location where a target device is located. The RF energy may be captured using an energy recovery unit disposed in the target device. The recovery unit (RU) may have, among other components, measurement circuitry, processing and communication circuitry, and the like. An RU may utilize various means of power recovery, such as rectennas to collect the RF energy and convert it to DC energy. FIG. 1 shows a GU 20 wirelessly powering an RU 40. GU 20 is shown as including, in part, a processor 10, a controller 12, a wireless communication circuit 14 and an array of transmit antennas 16. RU 40 is shown as including, in part, a processor 30, a power detector 32, a wireless communication circuit 34 and an array of receive antennas 36.

The GU is ideally adapted to transmit and transfer power in different directions and orientations rapidly and effectively, without much power spill-over (i.e., power not recovered and thus wasted). The GU achieves maximum power transfer by setting a combination of phases of the RF signals that maximize the energy concentration at the RU's location and orientation.

For a given effective GU aperture area of $A_G$, an effective RU aperture area of $A_R$, a distance D between the GU and the RU, and a signal wavelength of $\lambda$, the transfer efficiency, $\eta$, defined as the ratio of the power incident on the RU aperture to the power transmitted by the GU may be approximated as:

$$\eta = \frac{P_{RU}}{P_{GU}} \approx 1 - e^{-\tau} \qquad (1)$$

where $$r = \frac{A_G A_R}{(\lambda D)^2} \qquad (2)$$

At relatively large distances, the transfer efficiency may be estimated as r thus yielding:

$$\eta = \frac{P_{RU}}{P_{GU}} \approx \frac{A_G A_R}{(\lambda D)^2} \qquad (3)$$

Equation (3) assumes that the GU's and RU's apertures are facing each other and are both perpendicular to the axis connecting their centers.

Target devices to be charged wirelessly using the same GU may be at different locations and orientations with respect to the GU. Therefore, some of the target devices may not receive power optimally due to their locations and orientations. Furthermore, the path between the GU and a target device may by obstructed even under optimum phase combinations and the resulting constructive interference pattern. A need continues to exist for an improved method and system of wireless power delivery.

BRIEF SUMMARY OF THE INVENTION

A wireless power delivery system, in accordance with one embodiment of the present invention, includes, in part, a roaming and articulating wireless power transfer device that, in turn includes, in part, a wireless power generation unit, an energy storage unit, a controller, and an electrically driven moving platform. The wireless power generation unit includes, in part, least one source of electromagnetic power.

In one embodiment, the wireless power generation unit further includes, in part, at least one RF transmitter. In one embodiment, the wireless power generation unit further includes, in part, an array of RF transmitters adapted to radiate RF signals at the same frequency. In one embodiment, the controller is adapted to control the phase of each RF transmitter independently.

In one embodiment, the roaming and articulating wireless power transfer device (device) further includes one or more sensors. In one embodiment, the moving platform incudes, in part, an inertia measurement unit to facilitate navigation. In one embodiment, the moving platform includes, in part, a GPS to facilitate navigation. In one embodiment, the moving platform includes, in part, bump sensors to change direction of the movement upon hitting an obstacle. In one embodiment, the moving platform includes, in part, proximity sensors to avoid hitting obstacles. In one embodiment, the proximity sensors use ultrasound. In one embodiment, the proximity sensors include IR sensors. In one embodiment, the device further includes a camera.

In one embodiment, the device is adapted to locate a power recovery unit by using the camera to identify patterns printed or disposed on the recovery unit. In one embodiment, the device further includes a wireless communication link. In one embodiment, the device establishes a two-way communication with a recovery unit via the communication link. In one embodiment, the energy storage unit is a battery. In one embodiment, the battery is rechargeable. In one embodiment, the battery is charged via a docking station.

In one embodiment, the device further includes an inductive charging coil. In one embodiment, the docking station is adapted to charge the device inductively using the inductive charging coil. In one embodiment, the device is further adapted to locate the docking station via beacons transmitted by the docking station. In one embodiment, the energy storage unit is a fuel cell.

In one embodiment, the power generation unit transmits electromagnetic waves in the visible or infrared spectrum to wirelessly transfer power. In one embodiment, the wireless power delivery system further includes, in part, at least one motor adapted to change an elevation angle of the wireless power generation unit. In one embodiment, the wireless power delivery system further includes, in part, a scissor lift structure adapted to change the elevation angle of the wireless power generation unit in response to the motor. In one embodiment, the wireless power delivery system further includes, in part, a telescopic boom lift structure adapted to change the elevation angle of the wireless power generation unit in response to the motor.

In one embodiment, the wireless power delivery system further includes, in part, at least one motor adapted to change an azimuth angle of the wireless power generation unit. In one embodiment, the wireless power delivery system further includes, in part, at least one motor adapted to change an elevation height of the wireless power generation unit. In one embodiment, the wireless power delivery system further includes, in part, a scissor lift structure adapted to change the elevation height of the wireless power generation unit in response to the motor. In one embodiment, the wireless power delivery system further includes, in part, a telescopic boom lift structure adapted to change the elevation height of the wireless power generation unit in response to the motor In one embodiment, the system further includes, in part, a lift adapted to lift the system. In one embodiment, the system further includes, in part, a lift adapted to lift at least a portion of the wireless power generation unit. In one embodiment, the moving platform is adapted to navigate to a location from which the wireless power generation unit delivers maximum power to a recovery unit. In one embodiment, In one embodiment, the system is adapted to navigate and select an azimuth angle, elevation height and elevation angle of the wireless power generation unit such that the system delivers maximum power to a recovery unit. In one embodiment, the system is adapted to navigate and select an azimuth angle and phases of each RF transmitter of the wireless power generation unit such that the system delivers maximum power to a recovery unit.

In one embodiment, the controller includes a memory to store a list of recovery units to be wirelessly powered by the system. In one embodiment, the list includes a priority associated with each of the recovery units. In one embodiment, the priority for each recovery unit is established in accordance with a charge level of the recovery unit. In another embodiment, the priority for each recovery unit is established based on the distance of the recovery unit from the system.

In one embodiment, the system further includes, in part, a second roaming and articulating wireless power transfer device. The second roaming and articulating wireless power transfer device includes, in part, a wireless power generation unit that includes at least one source of electromagnetic power, an energy storage unit, a controller, and an electrically driven moving platform. The first and second wireless power generation units are configured to operate in concert so as to form a combined power generation unit larger than the first or the second power generation units. In one embodiment, the first and second devices share a reference clock frequency wirelessly received by the first and second devices. In one embodiment, the array of RF transmitters is foldable and expandable.

In one embodiment, the array of RF transmitters includes a multitude of fan-shaped subarrays. In one embodiment, the array of RF transmitters includes a multitude of subarrays mechanically coupled to one another via a multitude of spring loaded hinges. The system further include a motor and a string configured to retract the multitude of subarrays. In one embodiment, the array of RF transmitters includes a multitude of telescopic subarrays adapted to fold and unfold using gears. In one embodiment, the array of RF transmitters includes a multitude of subarrays adapted to fold and unfold according to an origami pattern.

A wireless power transfer system, in accordance with one embodiment of the present invention, includes, in part, a moving platform, and a reflector. In one embodiment, the system further includes, in part, at least one motor adapted to change the elevation angle of the reflector. In one embodiment, the system further includes, in part, at least one motor adapted to change the azimuth angle of the reflector. In one embodiment, the reflector is an RF reflector. In one embodiment, the RF reflector is curved.

A wireless power transfer system in accordance with one embodiment of the present invention, includes, in part, a wireless power generation unit that, in turn, includes, in part, a multitude of RF transmitters; and a wireless power recovery unit adapted to be wireless charged. The wireless power recovery unit includes, in part, at least one receive antennas having a variable orientation. In one embodiment, the wireless power recovery unit includes, in part, at least one RF receiver operating at substantially the same RF frequency as the RF transmitters.

In one embodiment, RF transmitters and the RF receiver form a radar. In one embodiment, the system further includes, in part, an electrically driven moving platform adapted to move the system to form a synthetic aperture radar. In one embodiment, the radar senses doppler shifts to detect biological signals. In one embodiment, the biological signals are defined by breathing. In one embodiment, the biological signals are defined by heartbeats. In one embodiment, the system is operated remotely by receiving commands transmitted from a remote control unit. In one embodiment, the remote control unit is a smartphone.

A wireless power transfer system, in accordance with one embodiment of the present invention, includes, in part, a wireless power generation unit that, in turn, includes a multitude of RF transmitters, a base, at least one arm mechanically coupling the wireless power generation unit to the base, a first actuator enabling the wireless power generation unit to swivel about the at least one arm, and a second actuator enabling the at least one arm to swivel about the base. In one embodiment, the base includes, in part, wheels. In one embodiment, wheels are adapted to move on tracks.

BRIEF DESCRIPTION OF THE DRAWINGS

FIG. 7E shows a retractable antenna array that includes a multitude of subarrays adapted to be folded and unfolded using an origami pattern, in accordance with one embodiment of the present invention.

FIG. 7F shows the antenna array of FIG. 7E after being partially folded, in accordance with one embodiment of the present invention.

FIG. 7G shows the antenna array of FIG. 7E after being folded, in accordance with one embodiment of the present invention.

DETAILED DESCRIPTION OF THE INVENTION

In accordance with one aspect of the present invention, a roaming and articulating generation unit (RAGU), actively searches for a target device(s) and moves to an optimum location and orientation to power the target device wirelessly. The RAGU may charge multiple target devices concurrently or during different time periods. The RAGU may prioritize the power delivery based on the charging status, such as the power need of the target devices. After charging one or a group of devices wirelessly during a first time period, the RAGU is adapted to search for a new target device(s), move to another optimum location and orientation—with respect to the new device—and start to transfer power to the new target device wirelessly.

A RAGU may have an internal energy storage unit that is charged, for example, using a wall outlet, a docking station, or from another wireless power generation unit (GU). The docking station may have electrical connectors and wiring that connects that RAGU to an external source of power (e.g., a wall outlet), or may charge the RAGU inductively. The device powered by a RAGU may be stationary, mobile or another RAGU. In one embodiment, a RAGU may provide power to a target device by transmitting electromagnetic waves (RF, mm-wave, light) or by sending acoustic waves.

In embodiments where the power is delivered using waves (e.g., acoustic, RF, mm-wave or light), the RAGU includes an array of transmit elements that operate coherently and in concert to generate a focused beam in order to achieve a lensing effect. In such embodiments, the energy is focused on the RU by adjusting the phases of the individual transmit elements of the transmitter array. Furthermore, in such embodiments, the power may be wirelessly transmitted using, for example, a directive source of waves such as a horn antenna, dish antenna, or alternatively using a collimated light source or laser. The following description of the embodiments of the present invention is provided with reference to wireless power delivery systems that generate and focus RF signals. It is understood, however, that embodiments of the present invention equally apply to mm, acoustic, optical waves, and the like.

Figure 1:
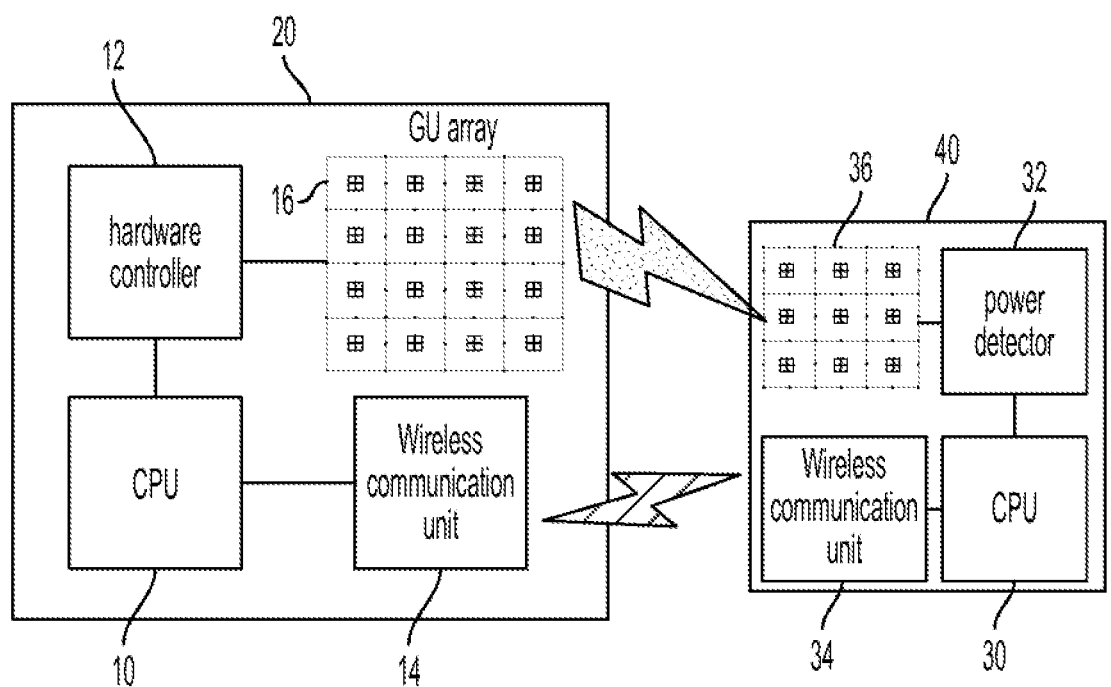
FIG. 1 shows a power generating unit wirelessly powering a device, as known in the prior art.
Figure 2A:
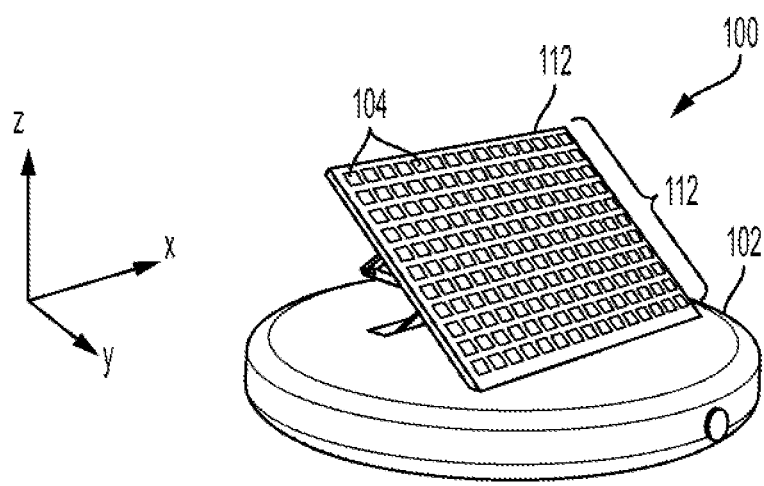
FIGS. 2A and 2B are simplified perspective front and back views of at roaming and articulating unit adapted to deliver power wirelessly, in accordance with one exemplary embodiment of the present invention.
Figure 2B:
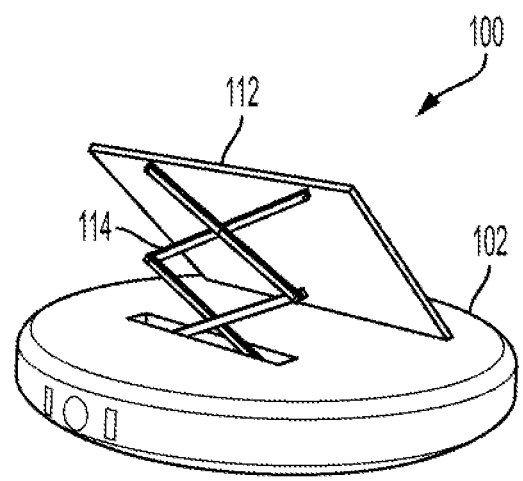

FIGS. 2A and 2B are simplified perspective front and back views of a RAGU 100, in accordance with one exemplary embodiment of the present invention. RAGU 100 may be a motor-driven wheel-based mobile wireless power delivery system shown as including, in part, a base 102 and a transmit antenna array 112. Base 102 is adapted to move along the x and y axes on the floor, and rotate along the z axis, as shown. The antenna array includes, in part, an array of transmit antennas 104 adapted to focus radio frequency signals on a target device. RAGU 100 also includes, in part, an articulation unit 114 that may be a crisscrossing scissors unit, as shown in the FIGS. 2A and 2B, adapted to adjust the height, orientation and tilt of the antenna array. RAGU 100 is thus adapted to optimize its location and orientation with respect to a target device through a combination of translational and rotational motion, as well as through the articulation of its antenna array 112. Although not shown, in some embodiments, the antenna array, which is the source of waves for powerless delivery, may be moved using, for example, a gimbal.

A RAGU, in accordance with some embodiments of the present invention, may include multi-modality sensing units. For example, in some embodiments, a RAGU may include (not shown) infra-red (IR) distance and proximity sensors, ultra-sonic sensors, optical cameras for visual sensing, radar, lidar, GPS, contact sensors, microphones, inertia measurement unit (IMU) sensors, field disturbance sensors, cameras, among other things. Such sensors enable a RAGU not only to navigate through confined spaces in places such as a home, office, store, warehouse, and the like, and provide a map of such spaces, but also to identify animate objects and other sensitive areas, where the nature and the amount of power to be transferred may need to be controlled.

A RAGU, in accordance with embodiments of the present invention, may be powered by an internal source of energy (e.g., rechargeable battery, fuel cells), or by an external power source to enable its movements, sensing, power delivery and other operations. A RAGU may use a docking station to receive power from a wall outlet. In some embodiments, a RAGU may be powered wirelessly by another RAGU.

Figure 3:
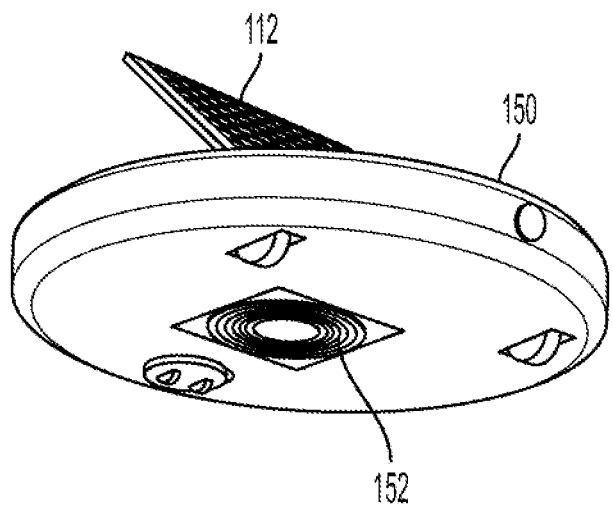
FIG. 3 is a bottom perspective view a roaming and articulating unit, in accordance with one exemplary embodiment of the present invention.

A RAGU may be charged wirelessly by means of proximity inductive charging. FIG. 3 is a bottom perspective view a RAGU 150, in accordance with one embodiment of the present invention. RAGU 150 is shown as including, in part, an inductive coil 152 used for inductive charging when the RAGU moves on to a charging pad not shown in the Figure. In some embodiments, a RAGU may power target devices wirelessly while positioned in a docking station or on a charging pad. When not in a docking station or a charging pad, a RAGU performs various sensing and wireless power delivery operations via its battery and internal power sources.

Figure 4:
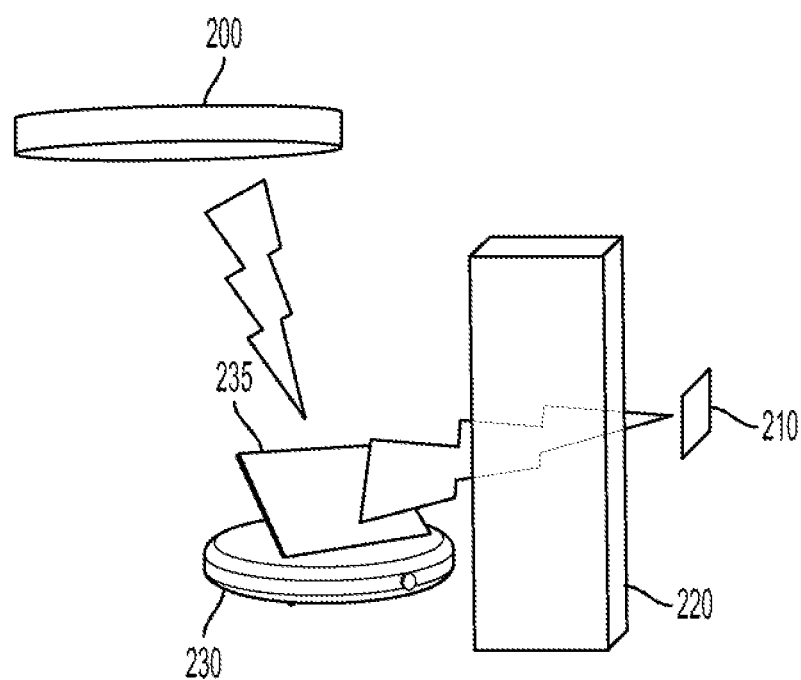
FIG. 4 shows a power generating unit wirelessly powering a device via a roaming and articulating passive unit, in accordance with one exemplary embodiment of the present invention.

In accordance with another aspect of the present invention, a roaming and articulating passive unit (RAPU), facilitates the transfer of wireless power, generated by another GU or RAGU, to one or more target devices. A RAPU may be a reflector, a refractor, or include a multitude of metasurfaces to redirect a beam of RF energy generated by a RAGU or another stationary RF wireless power generating unit (GU). For example, if the path from a GU or a RAGU to a target device is obstructed by an object, a RAPU is adapted to move into a position that enables the RF beam to be redirected to the target device. FIG. 4 shows a GU 200 attempting to wirelessly power target device 210. GU 200 is a stationary unit assumed to be mounted on, for example, a ceiling. The path of the RF power from GU 200 to device 210 is shown in FIG. 4 as being blocked by object 220. To effectuate the wireless power delivery, RAPU 230 moves into a new position, as shown, so that the RF power generated by GU 200 and reflected by the reflector 235 of the RAPU reaches target device 210 unobstructed.

Figure 5:
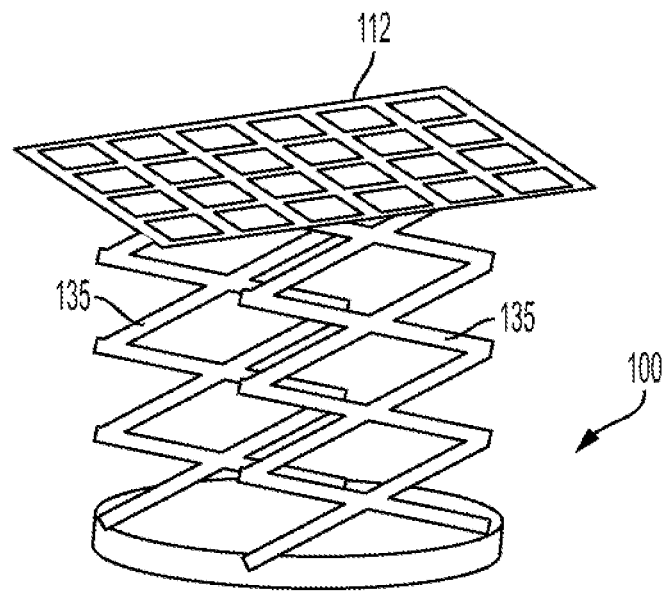
FIG. 5 is a schematic view of a roaming and articulating unit that includes a scissor lift structure, in accordance with one exemplary embodiment of the present invention.
Figure 6:
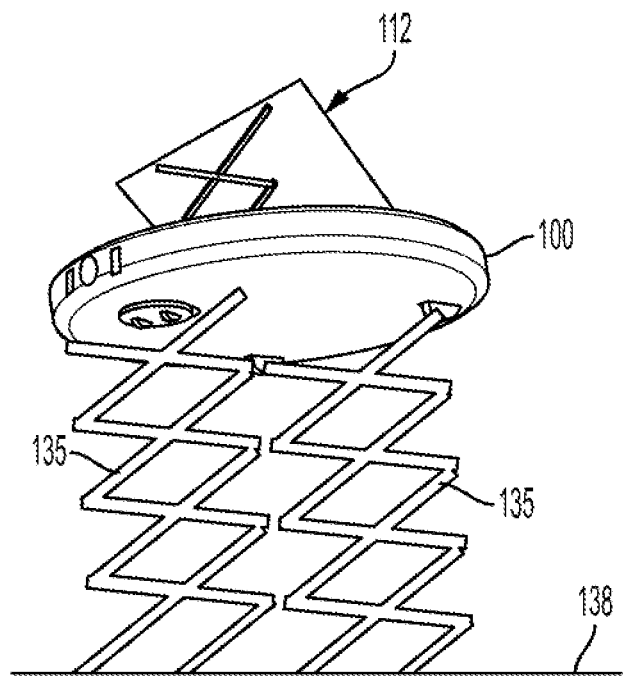
FIG. 6 is a schematic view of a roaming and articulating unit that includes a scissor lift structure, in accordance with another exemplary embodiment of the present invention.

As described above, in addition to translational and rotational motion, a RAGU may have an articulation mechanism adapted to lift, reorient and tilt the antenna array. FIG. 5 shows a RAGU 100 that includes a crisscrossing scissors 135 adapted to raise antenna array 112 from base 102 and thereby enhance its reach. Crisscrossing scissors 135 may also change the orientation and tilt of the antenna array. In yet other embodiments, a RAGU 100 may be lifted off the floor 138 in its entirety using crisscrossing scissors 135, as shown in FIG. 6, or using any other lift mechanism.

In some embodiments, the transmission aperture of a RAGU may be dynamically changed. For example, the aperture may expand out in a fan configuration, an accordion extension, or according to an Origami pattern. The mechanically retractable, foldable and adjustable aperture of a RAGU makes it more compact, thus enabling it to more easily move around and navigate the corners, uneven floors, step heights and hard to reach areas.

Figure 7A:
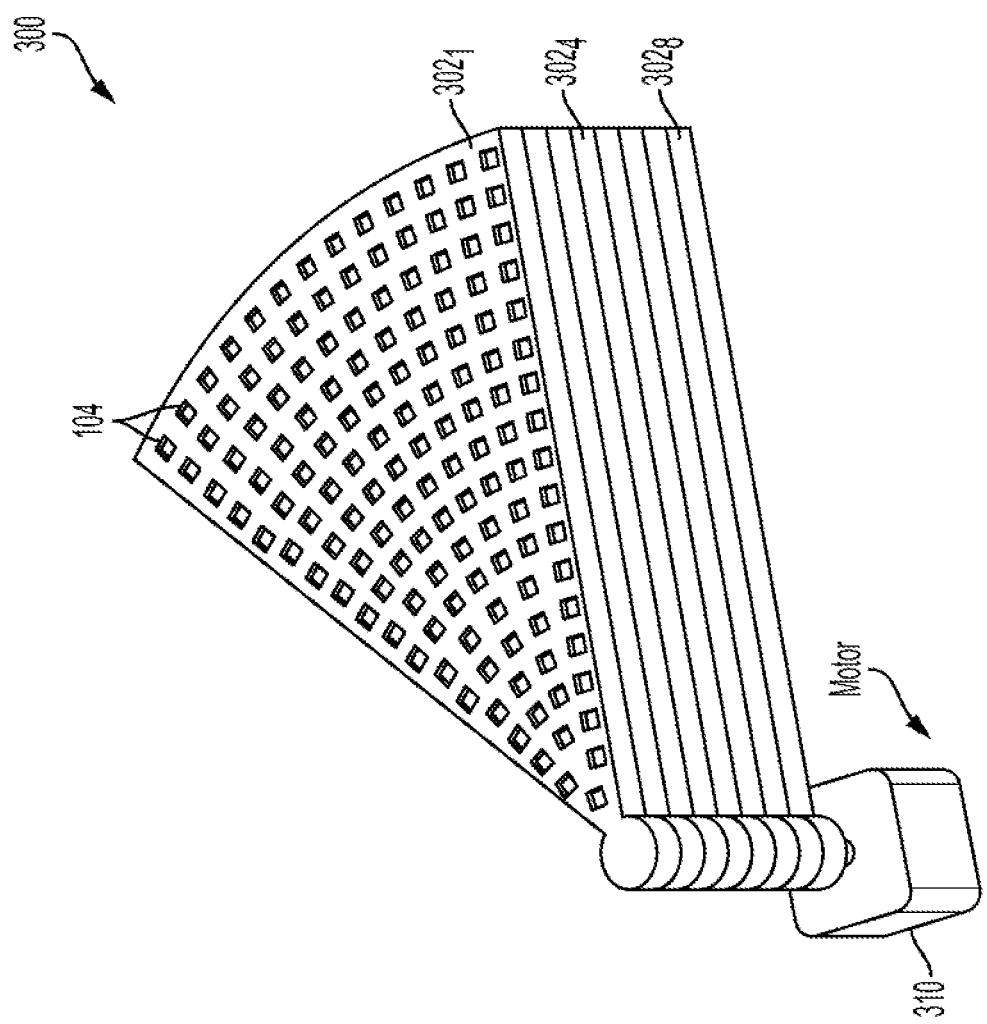
FIG. 7A shows a retractable antenna array that includes a multitude of fan-shaped subarrays, in accordance with one embodiment of the present invention.
Figure 7B:
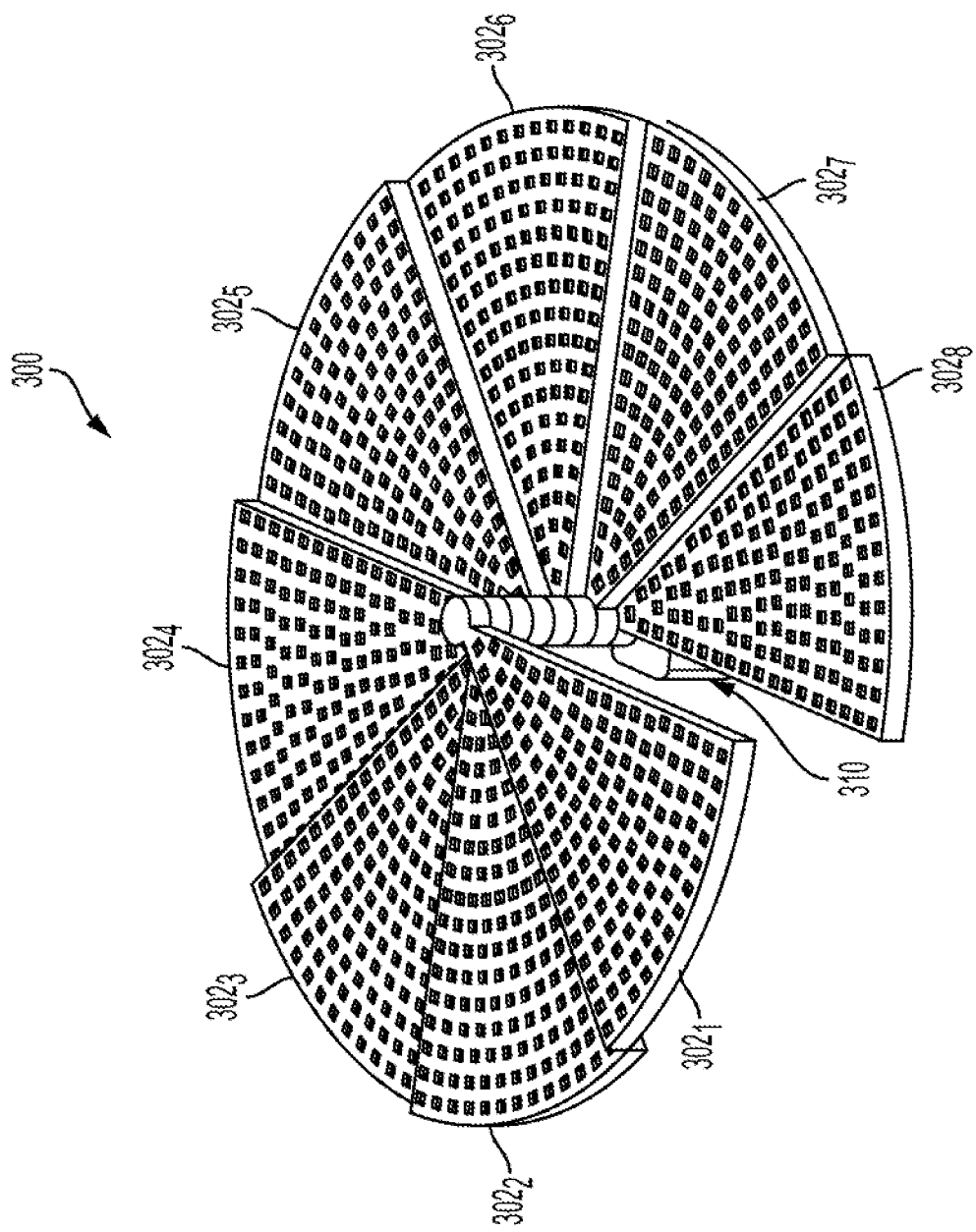
FIG. 7B shows the retractable antenna array of FIG. 7A in a fully deployed mode, in accordance with one embodiment of the present invention.

FIG. 7A shows a retractable antenna array 300 that includes 8 exemplary fan-shaped subarrays of $302_1$, $302_2 \ldots 302_8$, in accordance with one embodiment of the present invention. FIG. 7A shows array 300 in retracted mode and FIG. 7B show antenna array 300 in a fully deployed mode. The fan-shaped antenna arrays are retracted and deployed using motor 310 Each subarray is shown as including a multitude of transmit elements 104.

Figure 7C:
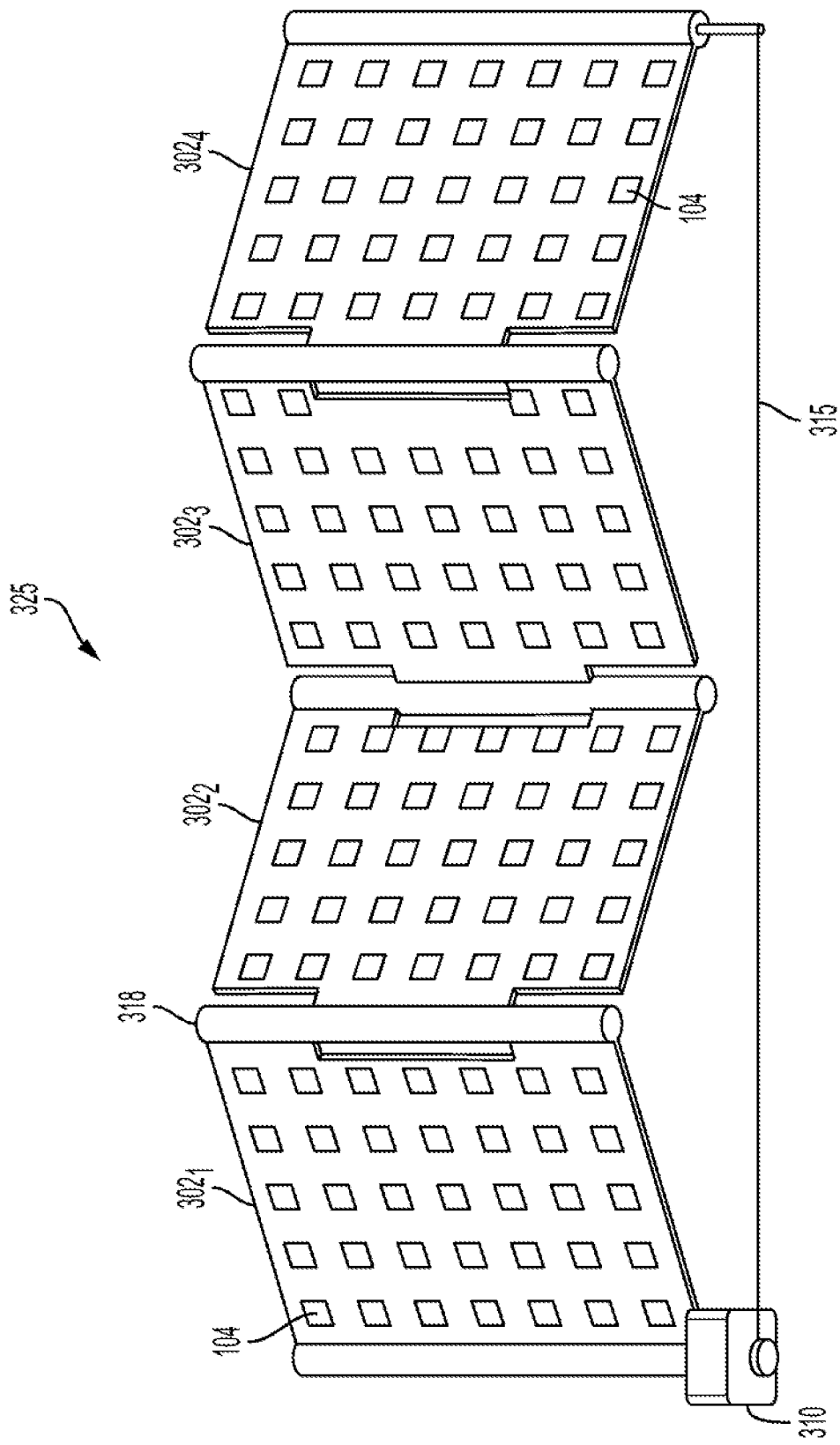
FIG. 7C shows a retractable antenna array that includes a multitude of subarrays, in accordance with one embodiment of the present invention.

FIG. 7C shows a retractable antenna array 325 that includes 4 exemplary rectangular-shaped subarrays $302_1$, $302_2 \ldots 302_4$, in accordance with one embodiment of the present invention. Retractable antenna array 325 includes hinges 318 that are spring loaded. Each subarray is shown as including a multitude of transmit elements 104. FIG. 7C shows antenna array 325 in the deployed (unfolded) mode. It is understood that antenna array 325 may be placed in a folded mode using motor 310 and string 315.

Figure 7D:
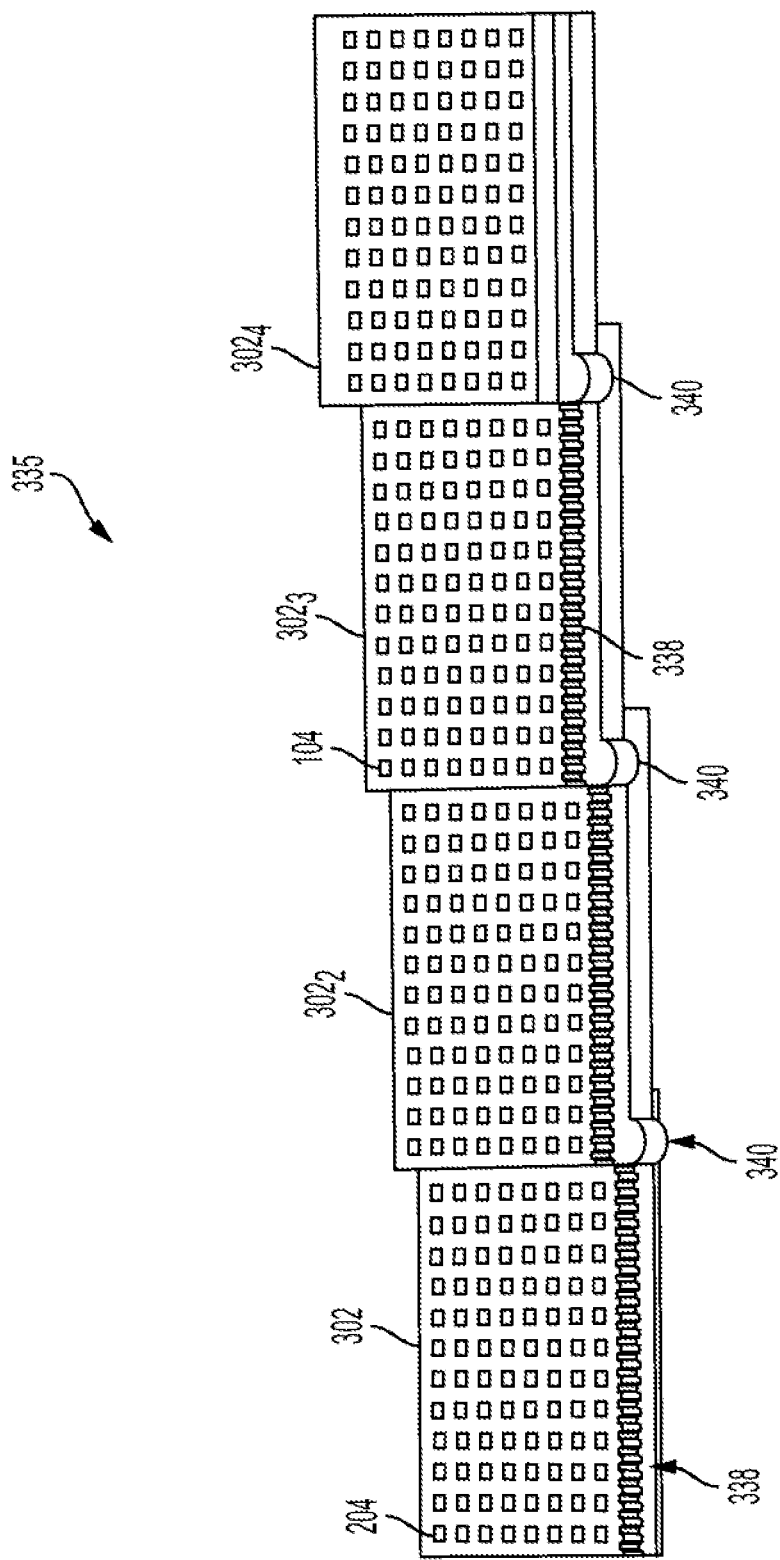
FIG. 7D shows a telescopic retractable antenna array that includes a multitude of subarrays, in accordance with one embodiment of the present invention.

FIG. 7D shows a telescopic retractable antenna array 335 that includes 4 exemplary rectangular-shaped subarrays $302_1$, $302_2 \ldots 302_4$, in accordance with one embodiment of the present invention. Retractable antenna array 335 includes gears 338 and motors 40 that enable the antenna array to retract or deploy. Each subarray is shown as including a multitude of transmit elements 104. FIG. 7D shows antenna array 335 in the deployed mode. It is understood that antenna array 335 may be placed in a folded mode using motors 340 and gears 338.

FIG. 7E shows a retractable antenna array 345 that includes 6 exemplary rectangular-shaped subarrays $302_1$, $302_2 \ldots 302_6$, in accordance with another embodiment of the present invention. Retractable antenna array 335 is adapted to be folded and unfolded using an origami pattern. FIG. 7F shows antenna array 345 that is partially folded. FIG. 7G shows antenna array 345 of FIG. 7G after further folding.

Figure 8:
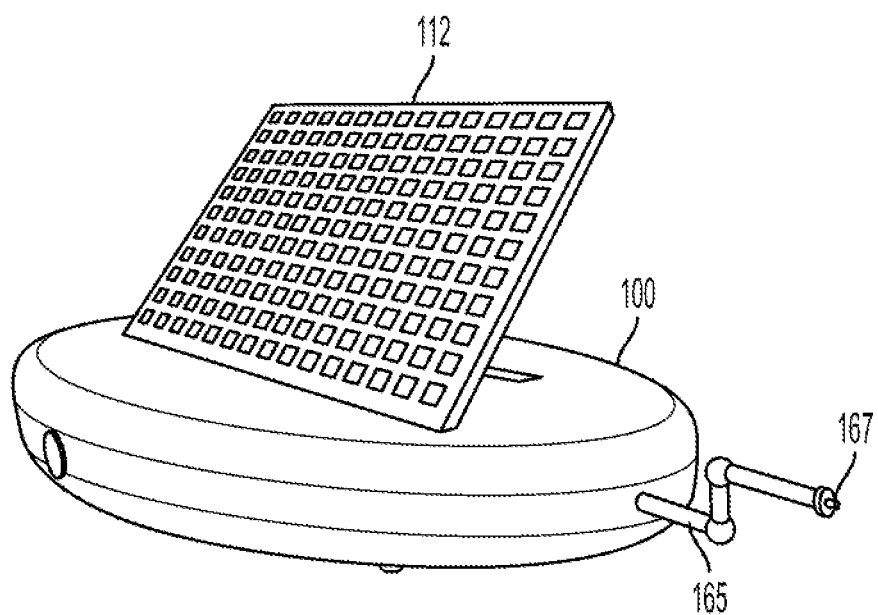
FIG. 8 shows a roaming and articulating unit with a self-articulating arm adapted to plug the roaming and articulating unit to a receptacle to charge the internal battery of the roaming and articulating unit, in accordance with one embodiment of the present invention.

A RAGU is adapted to monitor its energy status and locate and identify various power sources, such as a docking station, an inductive charging pad, or a wall outlet for charging its internal energy storage systems. In one embodiment, a RAGU uses its image acquisition system, such as a camera, or other sensors to locate a wall outlet. A self-articulating arm disposed within the RAGU can plug a cord into the outlet to initiate the charging process. To find the wall outlet, the RAGU uses a camera and image recognition algorithms. Once the electrical outlet is located, the RAGU moves toward the outlet. The articulating arm includes a linear stage that adjusts the height of the plug and rotation mechanism that adjusts the angle of the plug to that of outlet. Once the imaging system confirms alignment of the plug and outlet, the RAGU move closer towards the wall until the plug is inserted into the wall outlet. FIG. 8 shows a RAGU 100 with a self-articulating arm 165 adapted to plug the connector 167 disposed at the end of the arm 165 to a receptacle thereby to charge the internal battery of the RAGU.

Figure 9:
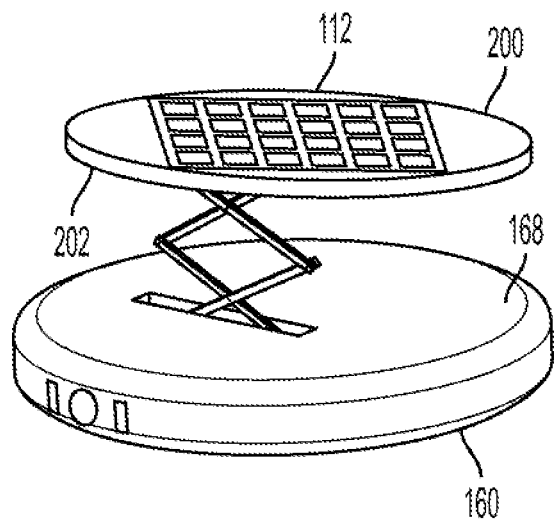
FIG. 9 shows a power generating unit having an array of transmit elements and antennas adapted be raised from a top surface of a roaming and articulating unit, in accordance with one embodiment of the present invention.
Figure 10:
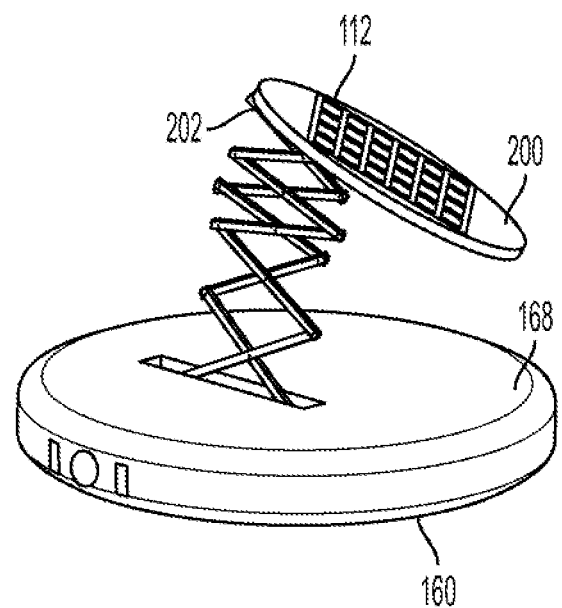
FIG. 10 shows a power generating unit having an array of transmit elements and antennas adapted be raised from a top surface of a roaming and articulating unit via a scissor lift structure, in accordance with one embodiment of the present invention.

In some embodiments, a roaming and articulating unit is adapted to receive a GU as an attachment thereby to form a RAGU. The roaming and articulating unit may be used for a variety of applications other than wireless power delivery. When a user decides to use the roaming and articulating unit to deliver power wirelessly to a target device, the user mounts the GU on top surface of the roaming and articulating unit. FIG. 9 shows a GU 200 (with an antenna array 112) that has been positioned to be mounted on top surface 168 of roaming and articulating unit 160. When so mounted, electrical connectors (not shown) provided on back surface 202 of GU 200 make electrical connections with corresponding connectors (not shown) provided on top surface 168 of the roaming and articulating unit so as to provide electrical power to GU 200. In some embodiments, the mounting components include a mechanism, such as crisscrossing scissors, for lifting and tilting the GU, as shown in FIG. 10.

To position itself for maximum power delivery, in one exemplary embodiment, the RAGU transmits power to the target device from a first location multiple times with each such transmission occurring after the RAGU rotates a certain amount. After each such rotation and transmission, the RAGU waits to receive, from the target device, information representative of the amount of the power recovered by the target device. Accordingly, the RAGU is aware of the amount of power recovered by the target device for each amount of rotation at the first location. The RAGU then moves to a second location to be closer to the target device along the angular rotation that provides the maximum power delivery to the target device. The RAGU then repeats the process of transmitting power to the target device from the second location multiple times, each time after rotating a certain amount and receiving, from the target device, information representative of the amount of the power recovered by the target device. The RAGU then moves toward the target device along the angular rotation that provides the maximum power delivery to the target device from the second direction. The RAGU continues to repeat the process of transmitting power, rotating in place, receiving information indicative of the level of received power back from the device, and determining the best direction to move toward until it finds a desirable location for power delivery. In one embodiment, the travel distance of the RAGU between each two successive locations is determined by the relative amount of power recovered (or received) by the target device. For example, when the power received by the device is relatively low, the RAGU travels a relatively longer distances. Conversely, when the power received by the device is relatively high, the RAGU travels a relatively shorter distance.

In accordance with another exemplary embodiment, to find a suitable location for powering a target device, the RAGU transmits power to the target device from an initial location multiple times with each such transmission occurring after the RAGU rotates a certain amount. After each such rotation and transmission, the RAGU waits to receive, from the target device, information representative of the amount of the power recovered by the device. The RAGU then moves to a second location along a direction that is different from that providing the maximum power. While at the second location, the RAGU transmits power to the target device multiple times with each such transmission occurring after the RAGU rotates a certain amount. After each such rotation and transmission from the second location, the RAGU waits to receive, from the target device, information representative of the amount of the power recovered by the device. Armed with the knowledge of the two different angles from two different locations that result in maximum power deliveries, the RAGU approximates the optimum location of the target device using a trilateration algorithm and moves to this optimum location for powering the device. The trilateration algorithm may also be performed when multiple RAGUs that are in communication with one another are used to wirelessly charge a device in a shorter time period.

The focusing of the electromagnetic waves on a target device by a RAGU may be carried out together with the mechanical movement of the RAGU. In other words, in addition to controlling and varying the phases of the individual transmit elements of the antenna array, the mechanical movements of the RAGU as well as its antenna array may be used to achieve focusing operation. The mechanical movements may occur concurrently with the phase adjustments or after the electromagnetic phase and amplitude adjustments have been performed.

Figure 11:
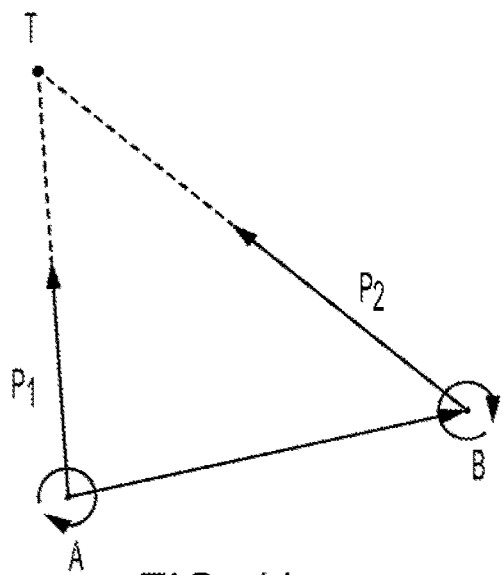
FIG. 11 shows a number of positions from which a roaming and articulating unit, in accordance with one embodiment of the present invention, transmits power to a target device.

FIG. 11 shows a first position A from which a RAGU transmits power to a target device N times (N is an integer greater than 1) each time after rotating a given amount about the Z-axis while remaining at point A. Assume that of the N power transmission from point A, the greatest power delivery, as recorded by the target device and relayed back to the RAGU, occurs along direction $P_1$. The RAGU then moves to a new position B along a direction different from $P_1$. While remaining at point B, the RAGU transmits power to the target device M times (M is an integer greater than 1 which may or may not be equal to N) each time after rotating a given amount about the Z-axis. Assume that of the M power transmission from point B, the greatest power delivery, as recorded by the target device and relayed back to the RAGU, occurs along direction $P_2$. Based on this information, the RAGU estimates that the target device is at point T where the lines drawn along directions $P_1$ and $P_2$ intersect. The processes described herein and the information obtained in determining the position of a target device and/or the optimum angle for powering the target is representative of the measure radiation pattern of the RAGU and may be used in subsequent calibration and control of the RAGU.

Figure 12A:
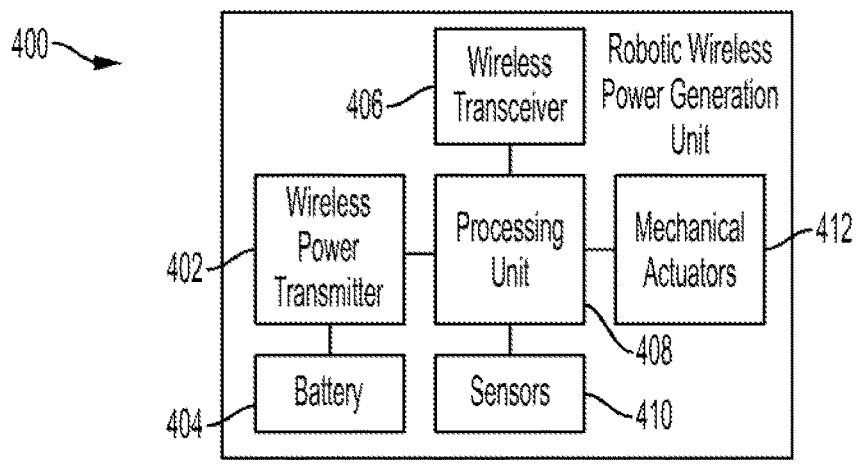
FIG. 12A shows various components of a roaming and articulating unit, in accordance with one exemplary embodiment of the present invention.

FIG. 12A shows various components of a RAGU 400, in accordance with one exemplary embodiment of the present invention. RAGU 400 is shown as including, in part, a wireless power transmitter 402, battery 404, wireless transceiver 406, processing and control unit 408, a multitude of sensors 410, and one or more mechanical actuators 412.

Figure 12B:
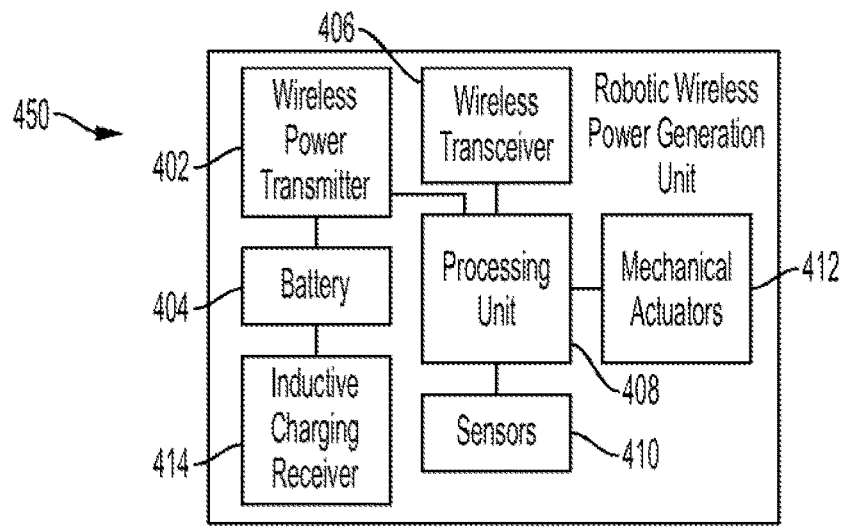
FIG. 12B shows various components of a roaming and articulating unit, in accordance with one exemplary embodiment of the present invention.

Wireless power transmitter 402 includes a transmit antenna array, such as antenna array 112 shown in FIG. 2A, as well as associated circuitry (not shown) for controlling phases of the individual transmit elements 104, also shown in FIG. 2A. Wireless transceiver 106 is configured to establish a communications link with the target device and includes a wireless transmitter and receiver. For example, the information representative of the amount of the power received by a target device from the RAGU is provided back to the RAGU via wireless transceiver 406. Processing and control unit 408 is configured, among other functions, to control the phases of the transmit elements 104, determine the angle and/or position from which the RAU charges the target device, control the action of the actuators 412, control the linear and rotational movement of the RAGU, process the data received by the sensors, and the like. Sensors 410 may include an inertia measurement unit (IMU) that may, in turn, include an accelerometer, a gyroscope, a magnetometer, and other sensors such as a GPS, a Doppler radar, one or more cameras, LIDAR, ultrasound, bump sensors, odometers, and the like, to determine the position and orientation of the RAGU with respect to, for example, a target device, the walls, furniture, and any other objects positioned within a confined area in which the RAGU is disposed. Actuators 412 are adapted to, among other things, lift the RAGU or its antenna array, tilt the antenna array, fold/unfold the antenna array, plug the RAGU in a wall outlet, and the like, as described above. FIG. 12B shows various components of a RAGU 450, in accordance with another embodiment of the present invention. RAGU 450 is similar to RAGU 400 except that RAGU 4500 includes an inductive charging receiver 414 for inductively charging the RAGU, as was also described above with reference to FIG. 3.

The Doppler radar, disposed in some embodiments of a RAGU, measures the speed of the RAGU relative to stationary objects. The Doppler radar may also be used by a RAGU to determine the relative angle of the RAGU with respect to walls, furniture, and other objects. The Doppler radar may also be used to keep a certain distance from, for example, a wall, or to run in parallel to the wall. The Doppler radar may also be used to map a room by transmitting RF signals and detecting the reflection off the walls, furniture, and the like, in the room. The Doppler shift of signals caused by the movement of the RAGU may also be used to locate obstacles present in the room.

When a RAGU that includes a Doppler radar roams, it can create a synthetic aperture. Hence a RAGU may operate as a synthetic aperture radar with a synthetic aperture as large as the room in which it roams, thereby to create an accurate holographic image of the room. By using beamforming via its transmit antenna array, signal receiving capabilities via its wireless transceiver (see FIG. 12A), its translational movement, and its Doppler radar, a RAGU may detect locations of humans (and/or other live organisms and pets) in a room by processing the Doppler shift caused by subtle movement of the skin, such as those due to heartbeat, and map their presence. For example, using a Doppler radar, a RAGU can detect if a person has fallen, whether the heart bit rates of the individual occupants of a resident have changed substantially, and the like.

By creating a holographic image of the room and mapping the positions of its human occupants, a RAGU is further adapted to find an optimum position for a number of other devices, such as speakers, that may be placed in the room. For example, in one embodiment, the RAGU may carry a speaker around a room as music is being played through the speaker, while actively finding an ideal location for the speaker by mapping humans in the room. To achieve this, using its Doppler radar, the RAGU detects the position of the person. Next, the Doppler radar, by detecting the vibrations that the acoustic waves—generated by the speaker—create on the person's skin, provides information representative of the degree of equalization and thus of the optimum position for the speaker. For example, a RAGU's Doppler radar can identify, for a pair of speakers, a pair of optimum locations that cause, for example, the same skin vibrations when the speakers emit acoustic waves.

In some applications, a speaker may have its own motorized vehicle. The RAGU can find a suitable place for such a speaker by detecting the vibrations that the speaker generates on a person's skin as it moves to different locations. By comparing the degree of detected vibrations to values generated during a calibration phase, the RAGU can thus find the optimum location for the speaker. Therefore, in contrast to conventional audio systems that rely on a microphone to perform equalization and determine the optimum locations of speaker system, a RAGU's Doppler radar, in accordance with embodiments of the present invention, uses the skin vibrations of a person to find the optimum positions of a speaker system so as to achieve sound equalization. The speakers may also be charged by the RAGU.

In some embodiments, the RAGU uses the information it receives from its Doppler radar as well as information it receives from other sensors, such as cameras, LIDAR, ultrasound, bump sensors, odometers, and the like, to map the locations within which it is charging devices. By comparing the mapping data the RAGU generates from each trip around a confined area to the mapping data from previous trips, the RAGU is adapted to build a highly accurate and advanced model of the walls, chairs, toys, doors, and the like, of the area in which it operates. This, in turn, enables a RAGU to reach known devices efficiently and locate an optimal position for maximum power transfer to each such device.

Figure 13:
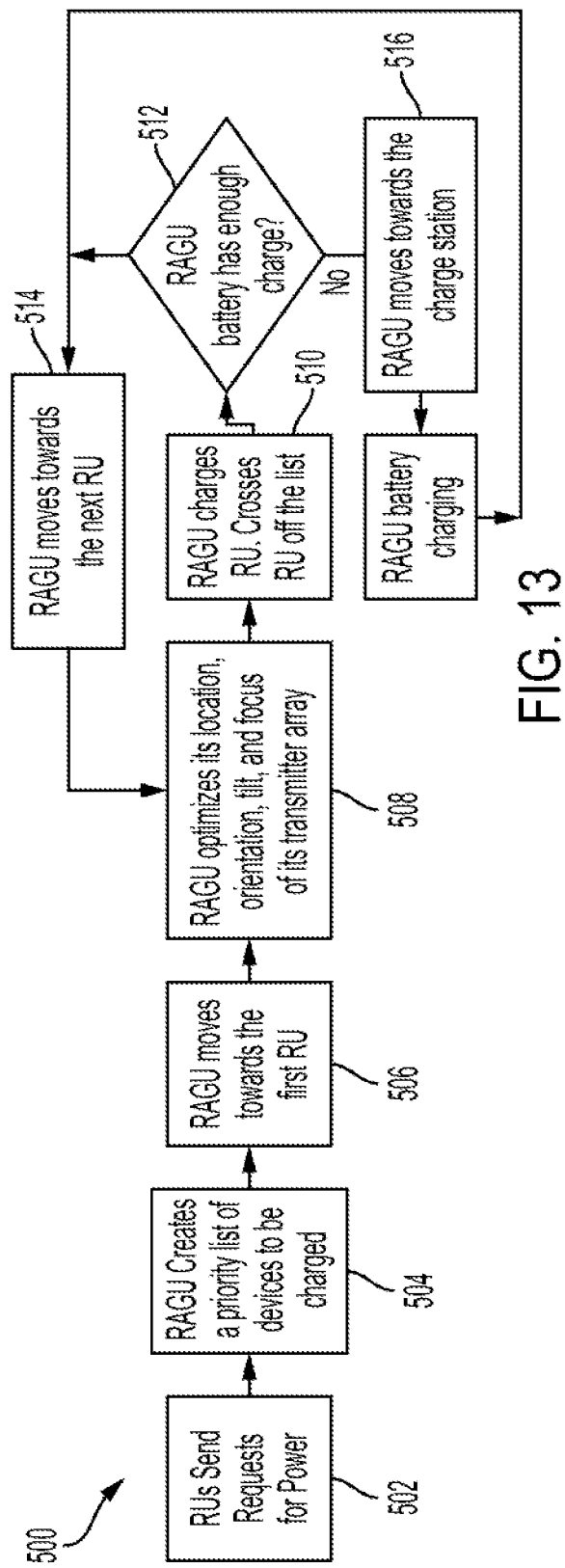
FIG. 13 is a flowchart for wireless charging of a target device by a roaming and articulating unit, in accordance with one embodiment of the present invention.

FIG. 13 is a flowchart 500 showing how a RAGU charges target devices, in accordance with one embodiment of the present invention. At 502, the target devices (also referred to herein as recovery devices, recovery units, or RUs) send requests for power. At 504, the RAGU generates a priority list of devices to be charged. At 506, the RAGU moves toward the first RU whose charging priority is determined to be the highest. At 508, the RAGU optimizes its location, orientation and tilt so as to focus the beam generated by its transmit antenna array toward the first device. At 510, the RAGU charges the first device and crosses the first device off its charging list. At 512, the RAGU determines whether it has enough charge to power the next device on the priority list. If at 512 the RAGU determines that it has enough charge to power the next device, at 514 the RAGU moves toward the next device and at 508 optimizes its location, orientation and tilt so as to focus the beam generated by its transmit antenna array toward the next device and then repeats the process at 510. If at 512 the RAGU determines that it does not have enough charge to power the second device, the RAGU moves toward the charging station at 516, and charges its battery at 518. Thereafter, the RAGU moves toward the next device at 514 and repeats the process at 508, as described above.

In some embodiments, a RAGU may identify an RU using a variety of mechanisms, such as a predetermined pattern (black and white, gray scale, and/or color) that can be identified by a camera or an image capture acquisition device disposed in the RAGU. In yet other embodiments, A RAGU may identify an RU using a barcode, or any other tag that has recognizable shapers or patterns and which is formed on the RU. In some embodiments, a RAGU may also have a receive antenna array that it can use together with its transmit antenna array to perform mono-static, bistatic, or multi-static sensing radars for mapping and location identification.

In accordance with one aspect of the present invention, a RAGU is controlled through a smartphone application. The application, among other things, enables a user, for example, to assign priorities according to which target devices are to be charged, and/or provide instructions to the RAGU about when to operate and when not operate in certain areas of the user's home/office/store. For example, a user may instruct the RAGU not to charge devices in the living room and kitchen before 10 PM, or may instruct the RAGU not to operate in the living room the coming weekend because a friend will be sleeping on the couch. This enable the users to keep track of their devices and the RAGUs when they are away from their homes or are out of town.

Through the application, a user may also inform the RAGU about the place in which the RAGU is operating, such as home, office, and the like. For example, a user may decide to take his/her RAGU to office during the day and back to home at night. The application enables a user to achieve this so that the RAGU knows of its whereabouts, and thus can use its previously stored mapping data to charge devices.

A RAGU, in accordance with embodiments of the present invention, is also adapted to keep track of how often it charges each device and communicates this information to the user via the application. For example, if a smoke detector that was previously requesting to be charged by a RAGU every 6 months, changes to making this request every 6 weeks, its battery may need to be replaced. By recording such data and reporting it to the user via the application, the user becomes aware that the smoke detector battery possibly needs to be replaced.

In one embodiment, a RAGU may be an airborne vehicle, such as a balloon, drone, and the like. In other embodiments, a GU may be mounted on an airborne vehicle and use its internal batteries, or the battery of the airborne device, which may be photovoltaic cells covering the surfaces of the airborne vehicle, to power target devices wirelessly. Such embodiments are adapted to provide power to any flying or stationary device.

A RAGU, in accordance with embodiments of the present invention, may perform a number of other functions and operate as other devices, such as a mobile speaker to play music, security sensor, wireless router and hub, room mapping, warehouse inventory updating, baby and health monitoring, among others. Furthermore, the antenna array of a GU or a RAGU is a phased array which when coupled with an array of receivers formed by a multitude of target devices (or an array of receivers disposed in a single target device) forms a phased array radar which can be used for navigation, sensing and other applications.

In yet other embodiments, a GU may be mounted on a surface of a submarine vehicle and use the energy harvested mechanically from water waves to power other devices and submarines that are out of reach.

Figure 14:
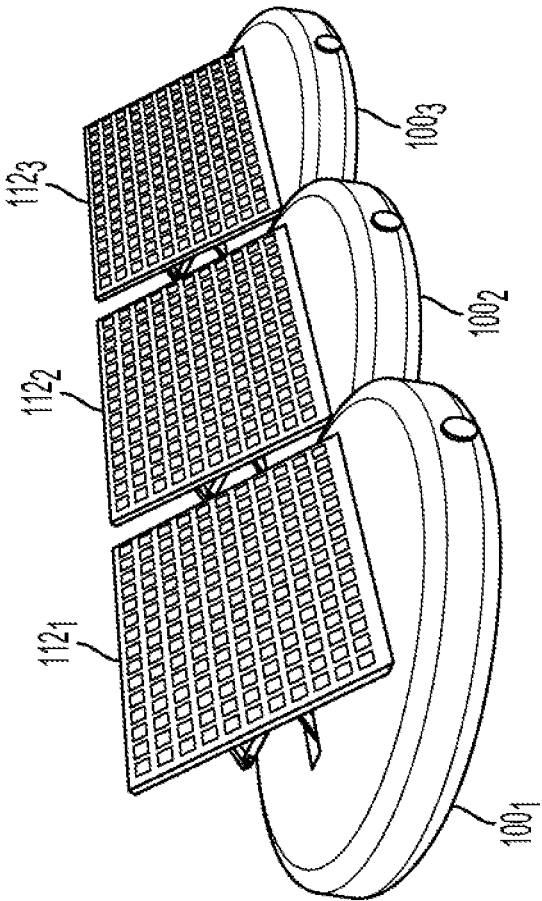
FIG. 14 shows a number of roaming and articulating units that have moved into close proximity of each other to form a relatively larger transmission aperture, in accordance with one embodiment of the present invention.

A RAGU and/or a RAPU is adapted to work collaboratively with other RAGUs and/or RAPUs. For example, a multitude of RAGUs may operate synchronously and in concert to provide a transmission aperture that is larger than that of the individual RAGUs. To achieve this, for example, two or more RAGUs navigate and position themselves in close proximity of each other, thereby to form a larger transmission aperture. FIG. 14 shows three RAGUs 1001, 1002 and 1003 that have moved into close proximity of each other to form a relatively larger transmission aperture. In other words, the transmission aperture of the combined antenna arrays 1121, 1122 and 1123 is greater than the transmission aperture of each of individual antenna arrays 1121, 1122 and 1123. Synchronization between RAGUs 1001, 1002 and 1003 may be achieved in several different ways. For example, in one embodiment, a reference clock signal that is transmitted wirelessly via an optical or RF transmitter by a GU, one of the RAGUs/RAPUs, or another wired or wireless device, may be used to synchronize the local clocks of the RAGUs so that they operate in concert to collectively form a single effective aperture in order to enhance the wireless power transfer efficiency and power level. In other words, collaboration between RAGUs, in accordance with embodiments of the present invention, provides enhanced range, power, and efficiency.

In one embodiment, when multiple RAGUs and RAPUs are deployed, one of the RAGUs or RAPUs may serve as a master with the remaining RAGUs and RAPUs operating as servants. In such embodiments, the master will provide instructions and control, either fully or partially, to the servants. In yet other embodiments, multiple RAGUs and RAPUs operate in a decentralized and self-organized fashion to operate as a swarm intelligence system.

In accordance with one aspect of the present invention, a recovery device/unit may be a roaming and articulating recover unit (RARU). A RARU can thus reposition and reorient itself to maximize power receipt and recovery. A RARU, for example, may be incorporated on wall mounted remotely powered devices and adjust the angle of its receive antenna array based on the height that the device is mounted on the wall or the minimum distance that a RAGU can approach the RARU.

Figure 15A:
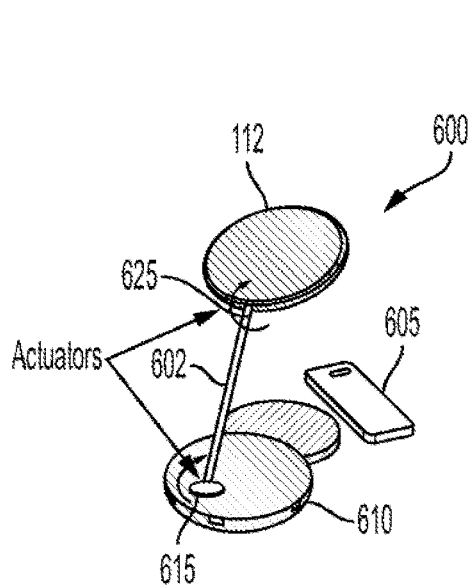
FIG. 15A shows a power generating unit with a transmitter array mounted on a base via an arm, in accordance with one embodiment of the present invention.
Figure 15B:
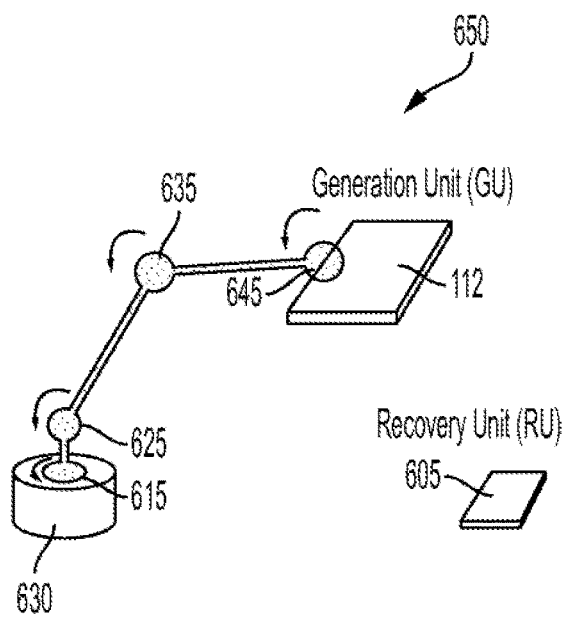
FIG. 15B shows a power generating unit with a transmitter array mounted on a base via a multitude of arms, in accordance with one embodiment of the present invention.

In one embodiment the GU antenna array can be mounted on moving arms similar to ones supporting a desk lamp. FIG. 15A shows a GU 600 that includes a transmitter array 112 mounted on base 610 via arm 602. GU 600 is adapted to change its height, tilt and orientation using actuator 615 and 625 to wirelessly power RU 605, in accordance with one embodiment of the present invention. FIG. 15B shows a GU 650 adapted to change its height, tilt and orientation using actuators 615, 625, 635 and 645, in accordance with another embodiment of the present invention. In some other embodiments, not shown, the number of actuators and the number of moving arms may be fewer or more than four depending on the desired degree of freedom.

Figure 16:
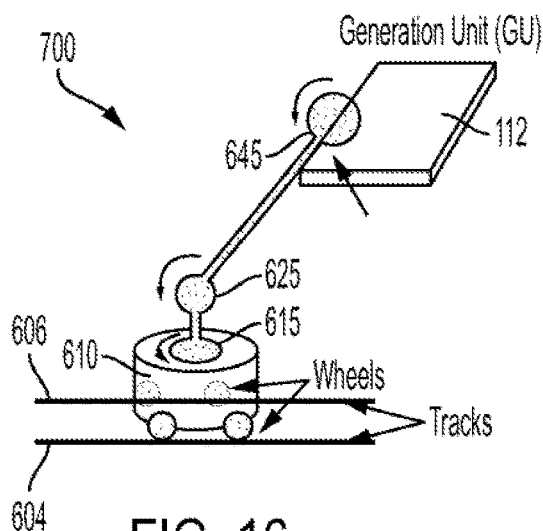
FIG. 16 shows a power generating unit with a transmitter array mounted on a base having wheels adapted to move on tracks, in accordance with one embodiment of the present invention.
Figure 17:
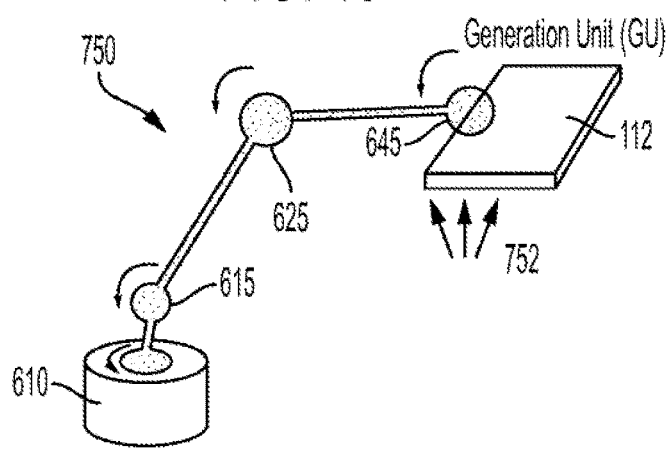
FIG. 17 shows a power generating unit having a transmitter array and a multitude of sensors mounted on a base via multiple arms, in accordance with one embodiment of the present invention.

In some embodiments, as described above, the GU may move using, for example, wheels. The GU may move around freely using tracks. FIG. 16 shows GU 700 having a base 610 that includes wheels adapted to move on tracks 604, 606. GU 700 is shown as including actuators 615, 625 and 645. FIG. 17 shows a GU 750 that includes a transmit array 112, actuators 615, 625, 645 and base 610. GU 750 is also shown as including a multitude of sensors collectively identified as 752.

The recovery unit (e.g., RU 605 shown in FIGS. 15A and 15B) transfer information such as the amount of received power, distribution of RF power over its antennas, orientation (through use of the RU's IMU sensors), requested power level, and the like, to the GU. The GU, based on the received information from RU and information from its own sensors 752 that include, for example IMUs, proximity sensors, Radar (ultrasonic, RF or LIDAR), and the like, determines the optimum direction of movement of the GU, orientation, tilt, height of the transmit array 112 and causes the actuators to achieve such optimum direction, orientation, tilt, and height. The estimated location(s) of a GU with respect to the RU(s) may be used to determine the optimum orientation of the GU to attain optimal power transfer to one or more RUs.

Figure 18:
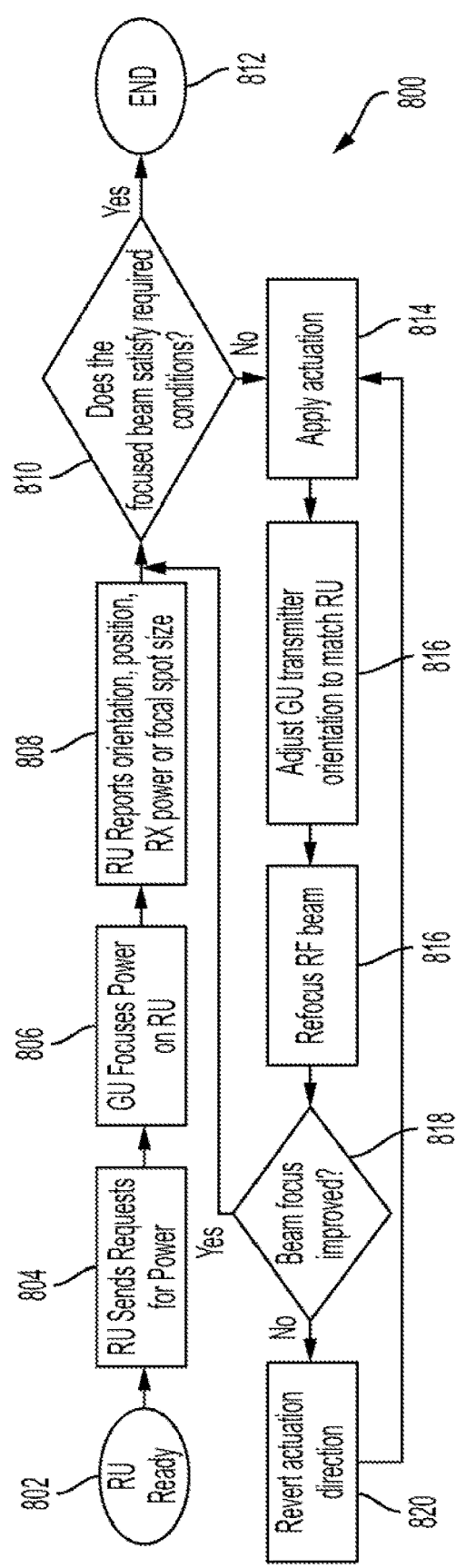
FIG. 18 is a flowchart for wirelessly powering a device, in accordance with one embodiment of the present invention.

FIG. 18 is a flowchart 800 for wirelessly powering an RU, in accordance with one embodiment of the present invention. After RU indicates its readiness to be charged at 802, the RU sends a request for power at 804. At 806, the GU focuses its RF beam on the RU. At 808 the RU reports its orientation, position, together with the power and the focal spot size of the power it receives from the GU, to the GU. If at 810 the RF beam is determined as satisfying predefined focusing conditions, no adjustment to the GU is required, and the GU continues to charge the RU until the charging is completed at 812.

If at 810 the RF beam is determined as not satisfying predefined focusing conditions, the actuators are engaged at 814. This causes the GU transmitter to adjust its various positioning parameters, such as height, orientation, tilt, and the like. At 816 the GU beam is refocused. If at 818, the beam focus is determined as being improved, as reported by the RU, the process moves to 810. If at 818, the beam focus is determined as not being improved, the actuation direction is reverted at 820, subsequent to which the actuation is engaged at 814 and the process is repeated.

Figure 19:
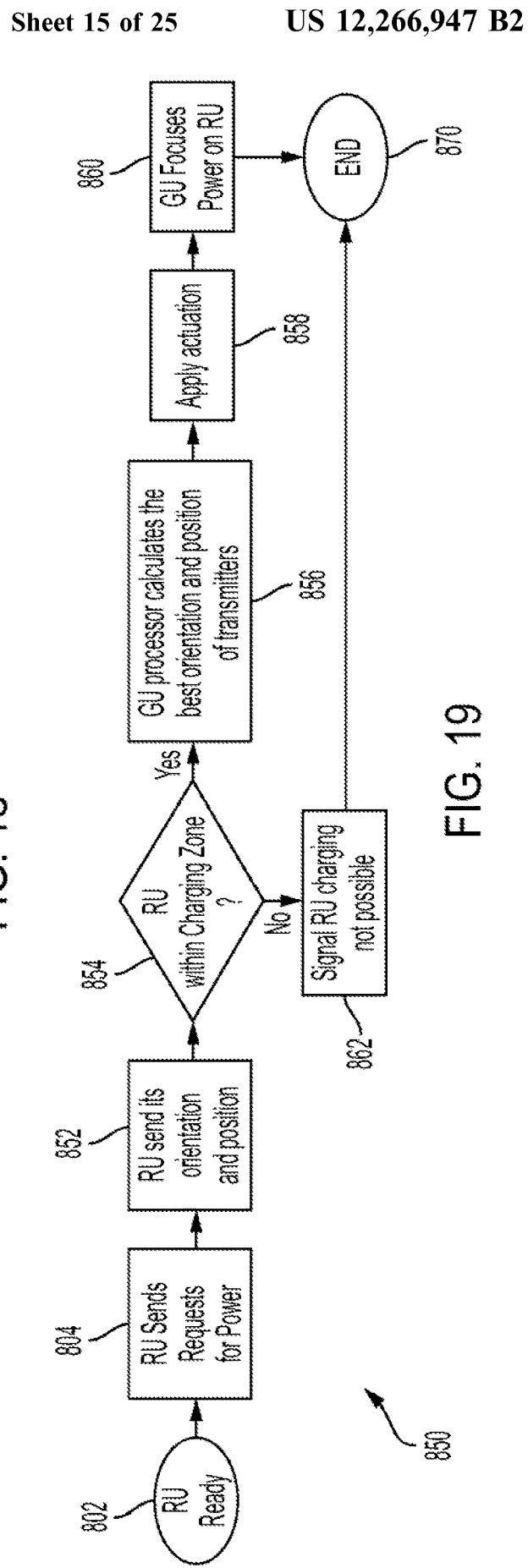
FIG. 19 is a flowchart for wirelessly powering a device, in accordance with one embodiment of the present invention.

FIG. 19 is a flowchart 850 for wirelessly powering an RU, in accordance with another embodiment of the present invention. After RU indicates its readiness to be charged at 802, the RU sends a request for power at 804. At 852, the RU sends information representative of its position and orientation to the GU. If at 854, the GU determines that the RU is within the GU charging zone, at 856 the GU determines an optimum position and orientation of its array of transmitters. Then at 858 the GU actuators are engaged thereby causing the GU to focus its RF beam on the RU at 860. The GU power remains focused on the RU until the RU is charged after which the process ends at 870. If at 854 the GU determines that the RU is not within the GU charging zone, at 862 the GU sends a signal to RU that wireless charging is not possible following which the process ends at 870.

It is understood that any robotic control algorithms including, but not limited to, PID controllers, gradient descent, artificial intelligence, genetic algorithm or simulated annealing can be used to guide the actuator movements based on input from RU and sensors to position the GU for optimum power transfer to the RU and navigate around objects. The calculation of the mechanical orientation and electronic phase settings can be based on a least-mean squares (LMS) maximization or highest priority power allocation approaches.

In some embodiments, using a subset of the sensors (e.g. Radar, LIDAR, ultrasonic, field disturbance sensors, etc.), a RAGU can detect the movement of other objects around it to vary its position and transmit RF power accordingly. For example, when the movement of a hand approaching the RU is detected, the RAGU processor will shut down RF power transfer before the users hand reaches the RF beam thus causing the actuators to move the transmitters away from RU and enabling the user to safely pick up the phone. A RAGU may use voice activated commands to start/stop charging, move toward specific RU to be charged, move out of the way, and the like.

When multiple RUs are to be charged, a RAGU may use any number of techniques to power the RUs. In one exemplary embodiment, the RAGU positions the transmitters in a location that charges with maximum efficiency and power transfer level, the RU having the highest priority, while concurrently powering other RUs at a lower rate. The priority of an RU may change dynamically during the process of charging as, for example, the charging states of the RUs change. A change in an RU priority, causes the RAGU to move, if necessary, to efficiently power another RU having acquired the highest priority.

In another exemplary embodiment, the RAGU positions its transmitter array in a location in which the efficiency of wireless power transfer is at least proportional to the priority of RUs to be charged. For example, an RU with a low priority may receive higher than a predefined efficiency level due to its proximity to another RU with a high priority.

In some embodiments, the RAGU may include lamps that operate as a desk lamp. The lamps may also be used as state indicators. For example, the light sources may change color, blink or dim to indicate, for example, that the transmitters are charging a device, the transmitter is in idle mode, or the like. The lighting source may also be used as an indicator of the coverage area of wireless power transfer system, where an RU placed in the illuminated area will be charged.

In accordance with one embodiment, wireless power transmission at a distance is achieved by high-efficiency light sources such as LEDs and lasers disposed on a GU or a RAGU. Such a GU or RAGU may include, in part, one or more light sources and optical system to collimate the light, optical/electronic components to process information capability, hardware interface, and communication circuitry. The energy generated by the light source may be directed to a desired location either by sending a collimated light beam or via focusing on one or more photovoltaic cells of an RU in order to convert the light energy into electricity for use by the target device in which the RU is disposed. Such an RU may include, in part, one or more measurement units, information/data processing and communication units, a power recovery array, and the like.

Figure 20A:
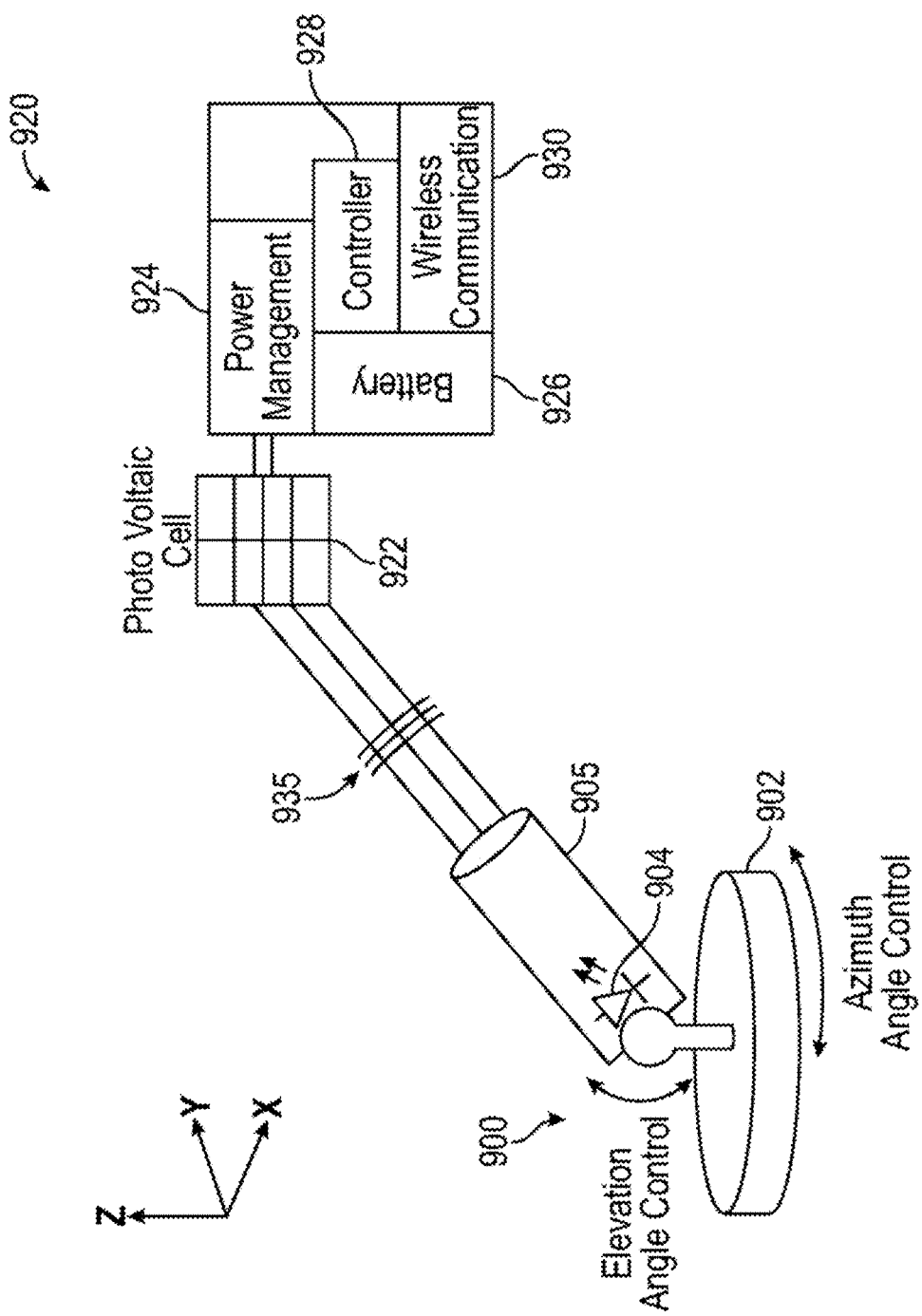
FIG. 20A shows, in part, a power generating unit adapted to wirelessly charge a target device using an optical beam.

FIG. 20A shows a RAGU 900 adapted to wirelessly charge an RU 920 via an optical beam 935, in accordance with another embodiment of the present invention. RAGU 900 is shown as including a base 902 on which optical assembly (also referred to herein as optical beam delivery system) 905 is mounted. Optical assembly 905 is shown as including, one or more sources of light 904. Optical assembly 904 is adapted to vary its elevation and angle. Moreover, as described in detail above, base 902 is adapted to move on the ground (i.e., along the X-Y axis) and rotate around the z-axis. RU 920 is shown as including, in part, a multitude of photo-voltaic cells 922, a power management unit 924, a controller 928, wireless communication unit 930, and a battery 926. As shown in FIG. 20A, the RAGU can transfer power in different directions and along different orientations. The RAGU achieves maximum power transfer by aligning the light beam 935 with the RU and ensuring that the focal spot size of the optical beam is approximately the same or smaller than the area of photovoltaic cell 922.

Figure 20B:
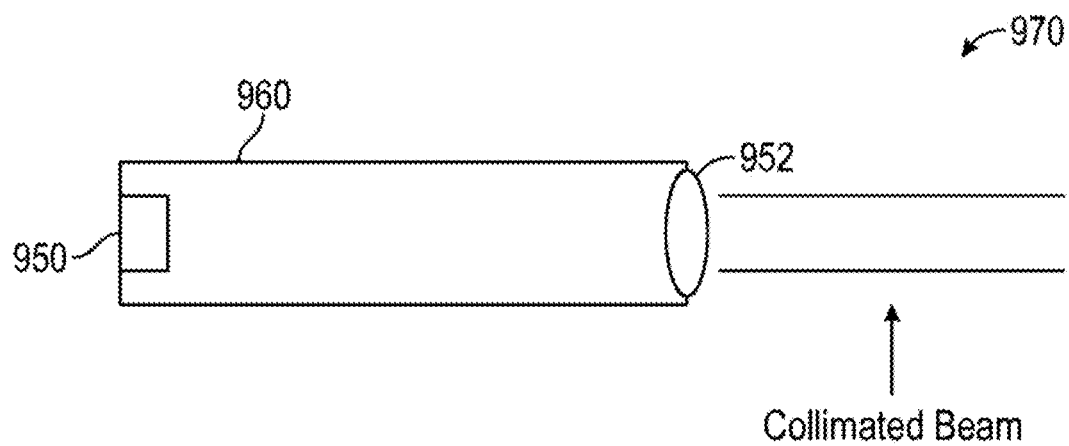
FIG. 20B shows an optical assembly adapted to deliver an optical beam to wirelessly charge a device, in accordance with one exemplary embodiment of the present invention.
Figure 20C:
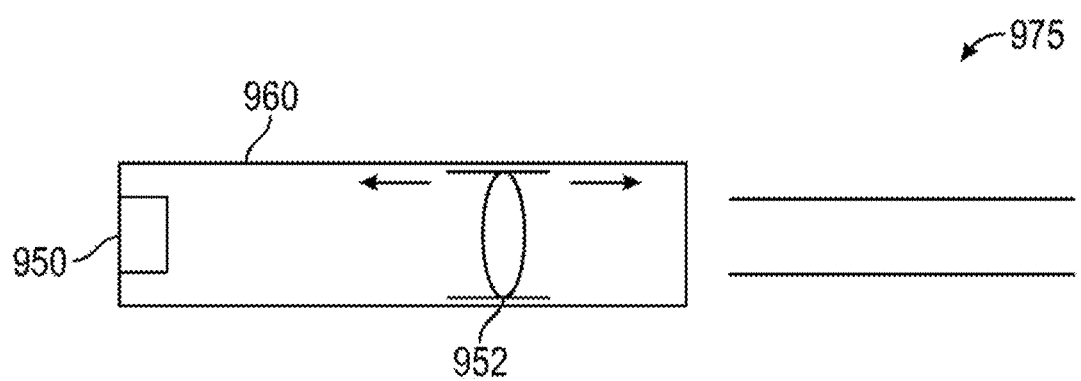
FIG. 20C shows an optical assembly adapted to deliver an optical beam to wirelessly charge a device, in accordance with one exemplary embodiment of the present invention.
Figure 20D:
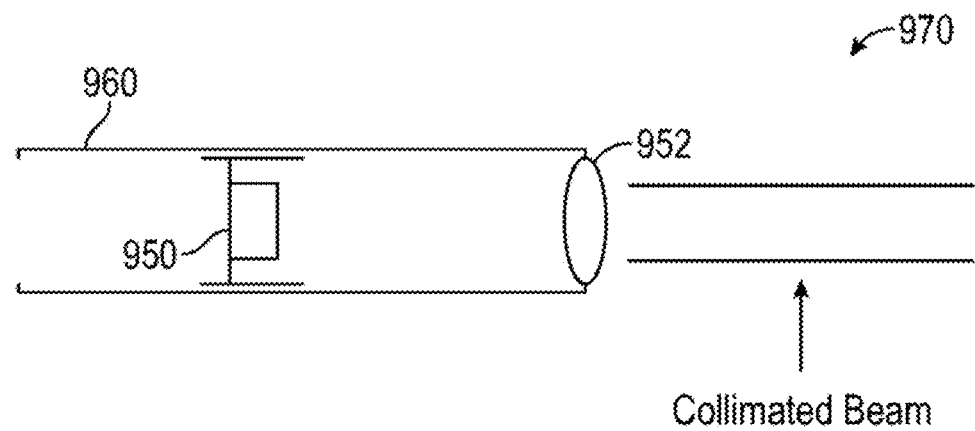
FIG. 20D shows an optical assembly adapted to deliver an optical beam to wirelessly charge a device, in accordance with one exemplary embodiment of the present invention.

FIGS. 20B, 20C and 20D show various exemplary embodiments for configuration of the laser/light source and its associated optics. In the embodiment shown in FIG. 20B, the optical component(s), e.g. lens 952 and laser 950—forming optical assembly 960—are fixed with respect to each other to generate a collimated beam 970. In the embodiment shown in FIG. 20C, laser 950 is shown as having a fixed position, whereas optical component(s) 952 is shown as being adapted to change its position along the optical axis so as to cause the optical beam 975 to vary between the collimated, converging or diverging beams. In the embodiment shown in FIG. 20D, optical component 952 is shown as having a fixed position, whereas laser 950 is shown as being adapted to change its position along the optical axis so as to cause the optical beam 975 to vary between the collimated, converging or diverging beams. The converging optical beam can be used to adjust so as to match the focal spot diameter on the RU's photovoltaic cells. The diverging optical beam can be used initially to create a larger diameter spot size that illuminates a larger area. This can be used to speed up the process of finding the RU location, as discussed further below. The light source may be modulated to encode information, such as the GU identification number, the Laser identification number, and the like.

In some embodiments, the optical beam for wirelessly charging a device is supplied by a RAGU that can move freely and provide power to various stationary and moving devices in need of energy for operation and/or charging. A RAGU may be adapted to have either an internal energy storage, or receive energy from an external source, such as a wall outlet, or a docking station. A RAGU may also be adapted to charge inductively, or via another GU, as described above.

The light source used for wireless energy transfer may be mounted on a RAGU, or it may have one or multiple degrees of freedom with respect to the RAGU. For example, only the elevation angle of the light source may be adjustable or both elevation and azimuth angle may be adjustable. A telescopic or scissor crossed arm may also be incorporated into the RAGU to vary the height of the light source and overcome obstruction by opaque objects that may be present in the light path (such as when charging a phone on a table).

The RAGU is capable of transmitting power to one or multiple other stationary or moving recovery unit(s) (RU) and other RAGUs. In some embodiments, the roaming base unit itself can provide the change in the azimuth (by rotating in place), and/or elevation (by pushing one end up). A RAGU may have more than one laser/light source which can be used independently to power multiple devices concurrently. In some embodiments, two or more RAGUs may operate in concert to provide power to one or more RUs. Each laser/light source may be modulated with a unique identifiable code to enable the RUs to distinguish each beam or the RAGU's ID.

Figure 21A:
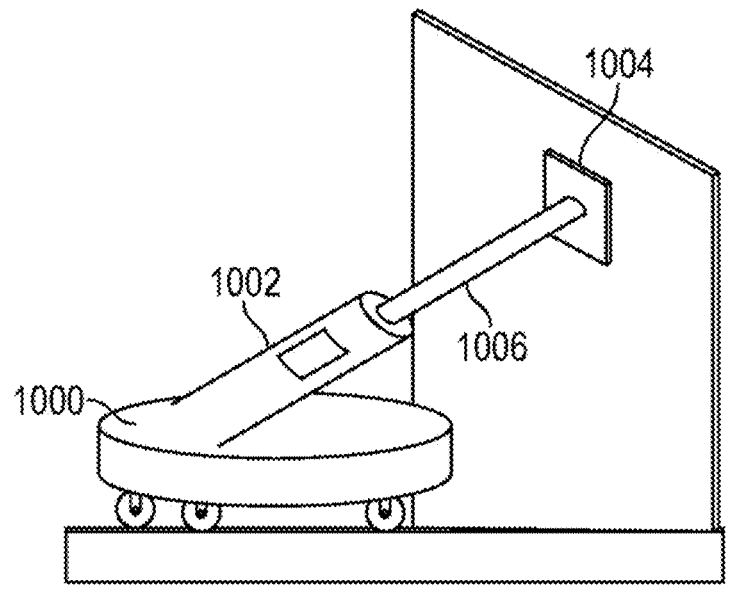
FIG. 21A shows a roaming and articulating unit having disposed thereon a fixed optical assembly that houses an optical source and associated optical components adapted to deliver an optical beam to charge a target device, in accordance with one embodiment of the present invention.
Figure 21B:
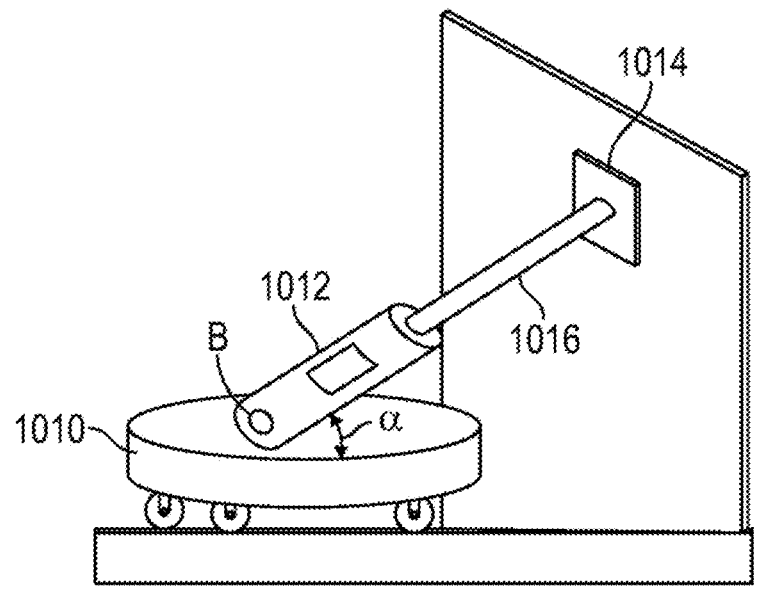
FIG. 21B shows a roaming and articulating unit having disposed thereon an optical assembly adapted to deliver an optical beam to charge a target device, in accordance with one embodiment of the present invention.

FIG. 21A shows a RAGU 1000 having a fixed optical assembly 1002 mounted thereon that houses a Laser (or other optical sources such as LEDs) and associated optical components adapted to deliver an optical beam to RU 1004, in accordance with one embodiment. RAGU 1000 is adapted to move and rotate to focus the optical beam 1006 on RU 1004. FIG. 21B shows a RAGU 1010 having an optical assembly 1012 that can pivot around point B to change its angle α relative to the x-y plane so as to change the elevation of beam 1016, in accordance with another embodiment. Beam 1016's azimuth angle can be changed via rotation of the RAGU. Optical assembly 1102 houses the optical source and associated optical components (not shown) adapted to deliver optical beam 1016 to RU 1014, in accordance with one embodiment.

Figure 21C:
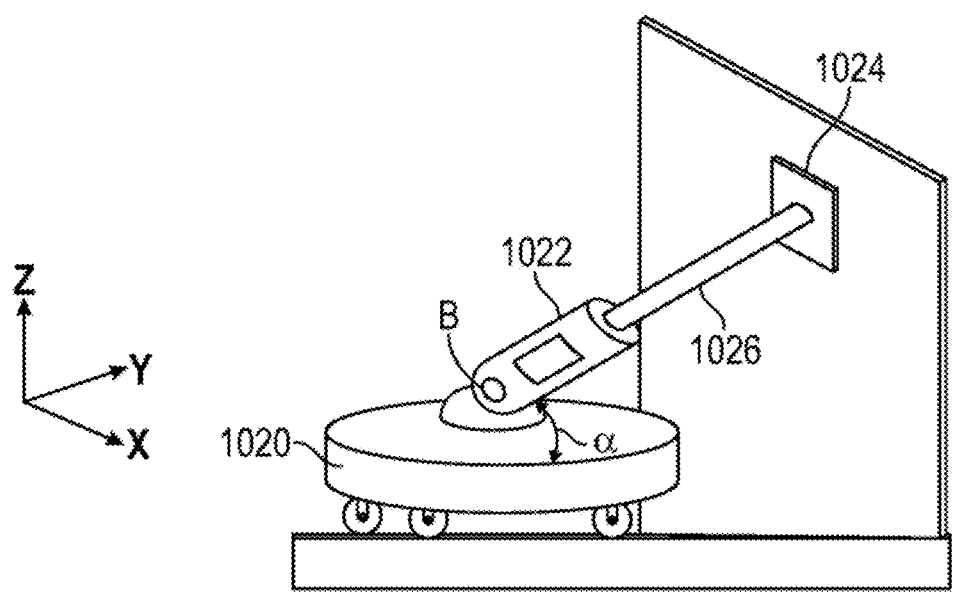
FIG. 21C shows a roaming and articulating unit having disposed thereon an optical assembly adapted to deliver an optical beam to charge a target device, in accordance with one embodiment of the present invention.

FIG. 21C shows a RAGU 1020 having an optical assembly 1022 that can pivot around point B to change its angle α relative to the plane of the RAGU, and further to rotate about the z-axis, in accordance with another embodiment. Optical assembly 1022 houses the optical source and associated optical components (not shown) adapted to deliver optical beam 1026 to RU 1024, in accordance with one embodiment of the present invention.

Figure 21D:
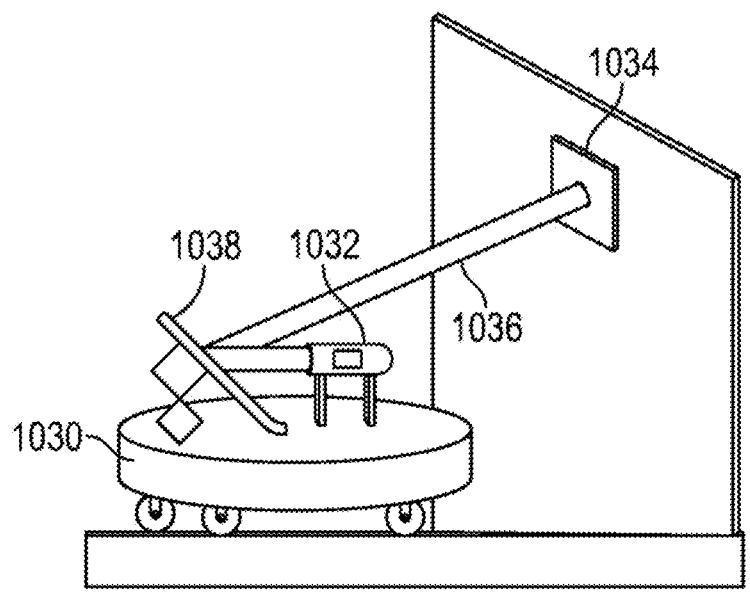
FIG. 21D shows a roaming and articulating unit having disposed thereon an optical assembly adapted to deliver an optical beam to charge a target device, in accordance with one embodiment of the present invention.

FIG. 21D shows a RAGU 1030 having an optical assembly 1032 that is fixed in place and houses the optical source and its associated optical components. Light from the optical source in optical assembly 1032 is delivered to movable mirror 1038 adapted to change the elevation and/or azimuth of the beam 1036 that is reflected off the mirror and delivered to RU 1034.

Figure 21E:
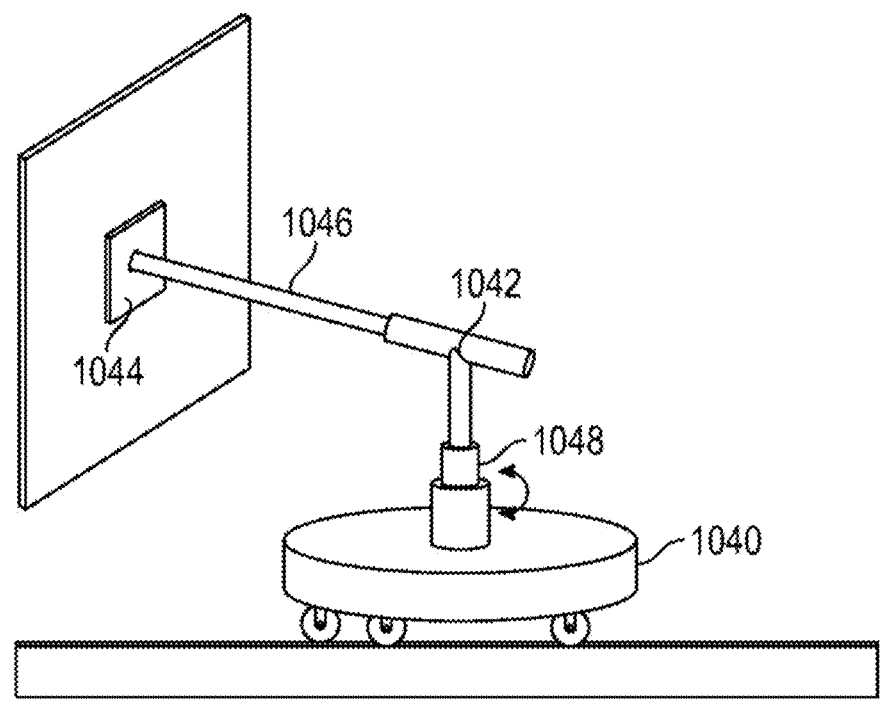
FIG. 21E shows a roaming and articulating unit having disposed thereon an optical assembly adapted to deliver an optical beam to charge a target device, in accordance with one embodiment of the present invention.

FIG. 21E shows a RAGU 1040 having an optical assembly 1042 that houses the optical source and its associated optical components. Telescopic arm 1048 is adapted to change the height of optical assembly 1042, as well as to rotate about the z-axis to focus the light beam 1046 on RU 1044. In some embodiments, the height of optical assembly 1042 may be changed using crisscrossing scissors as shown, for example, in FIG. 26.

Figure 22:
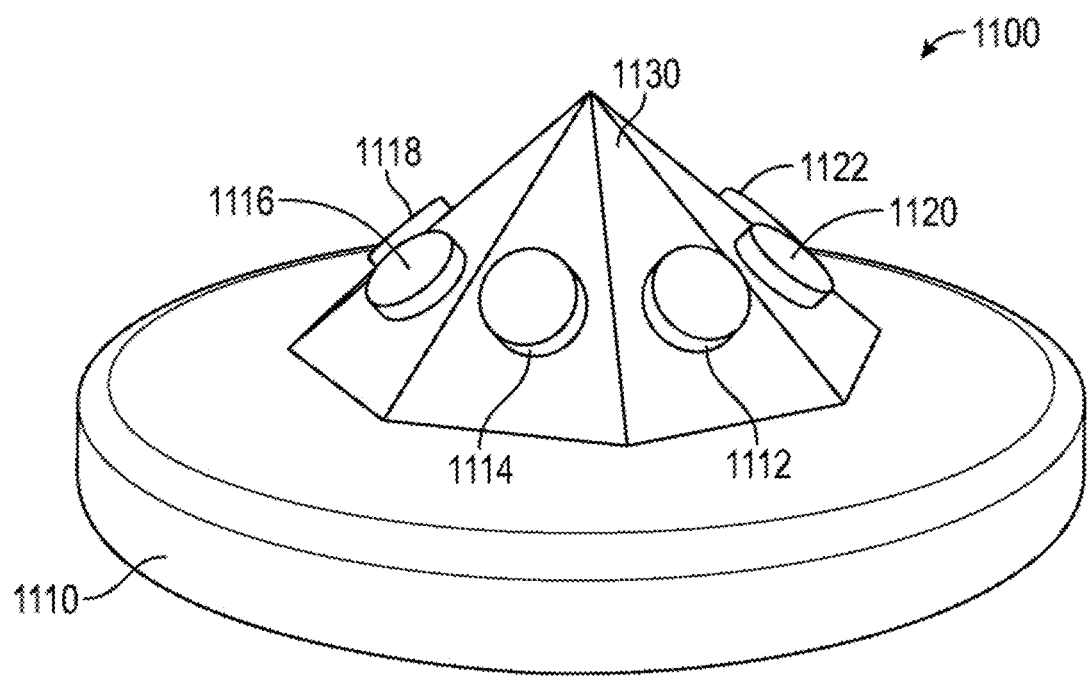
FIG. 22 shows a roaming and articulating unit that has a polyhedron optical assembly mounted thereon, in accordance with one embodiment of the present invention.

In some embodiments, multiple laser power sources may be disposed on an object having a three dimensional shape, such as a pyramid, a polyhedron, or a dome. FIG. 22 shows a RAGU 1100 that includes a polyhedron optical assembly 1130 mounted on base 1110. Exemplary polyhedron optical assembly 1130 is shown as having 8 triangular surfaces (faces), 6 of which are visible. Each such surface is adapted to have a laser or an optical source. Optical sources 1112, 114, 1116, 1118, 1120 and 1122 are shown in FIG. 22. RAGU 1100 is adapted to power multiple devices concurrently through rotation and articulation of the base, and/or movements of the facets with respect to each other and in multiple dimensions.

Figure 23:
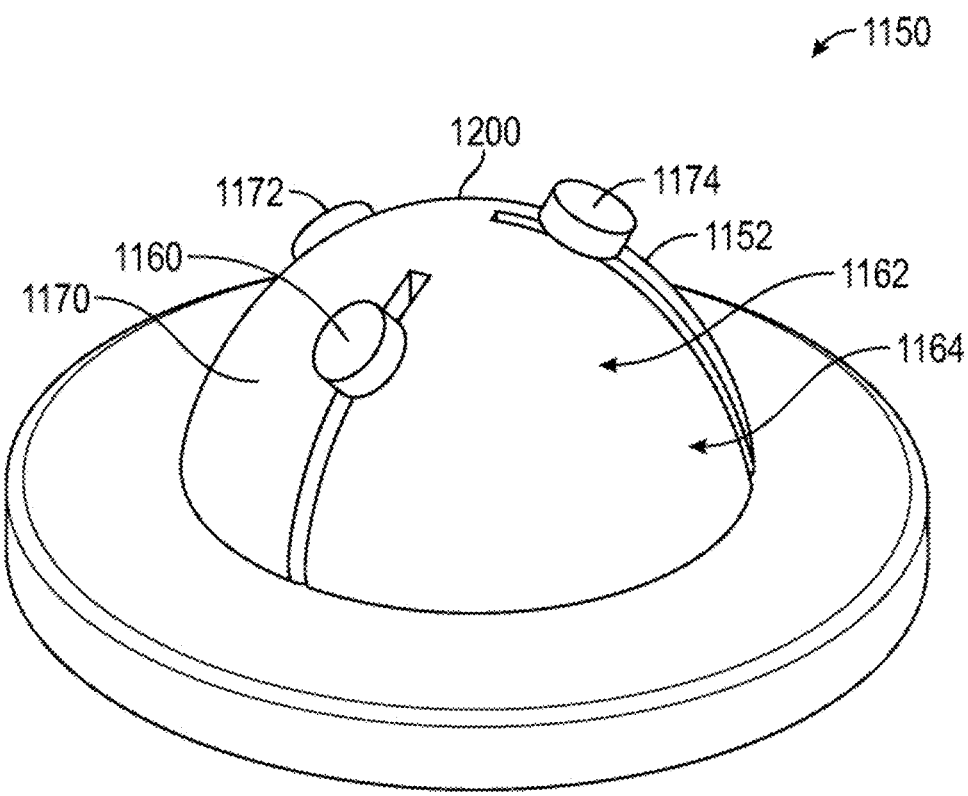
FIG. 23 shows a roaming and articulating unit that includes a dome-shaped structure with tracks along which optical components are adapted to travel, in accordance with one embodiment of the present invention.

In some embodiments each laser source is mounted on an optical assembly adapted to move along one, two, or three-dimensional tracks, thereby enabling the optical sources to move along the tracks. FIG. 23 shows a RAGU 1150 that includes a dome-shaped structure 1200 mounted on the RAGU's base. Dome-shaped structure 1200 is shown as including three tracks 1160, 1162 and 1164 that span along the curved geometry of the dome's surface. Components 1170, 1172 and 1174, each adapted to carry an optical source, are positioned in tracks 1160, 1162 and 1164 respectively. Embodiment 1150 provides for independent control of the optical sources' positions within the tracks. A control algorithm may be used to move the optical sources to optimum positions so as to achieve concurrent maximum power transfer to multiple targets.

Figure 24:
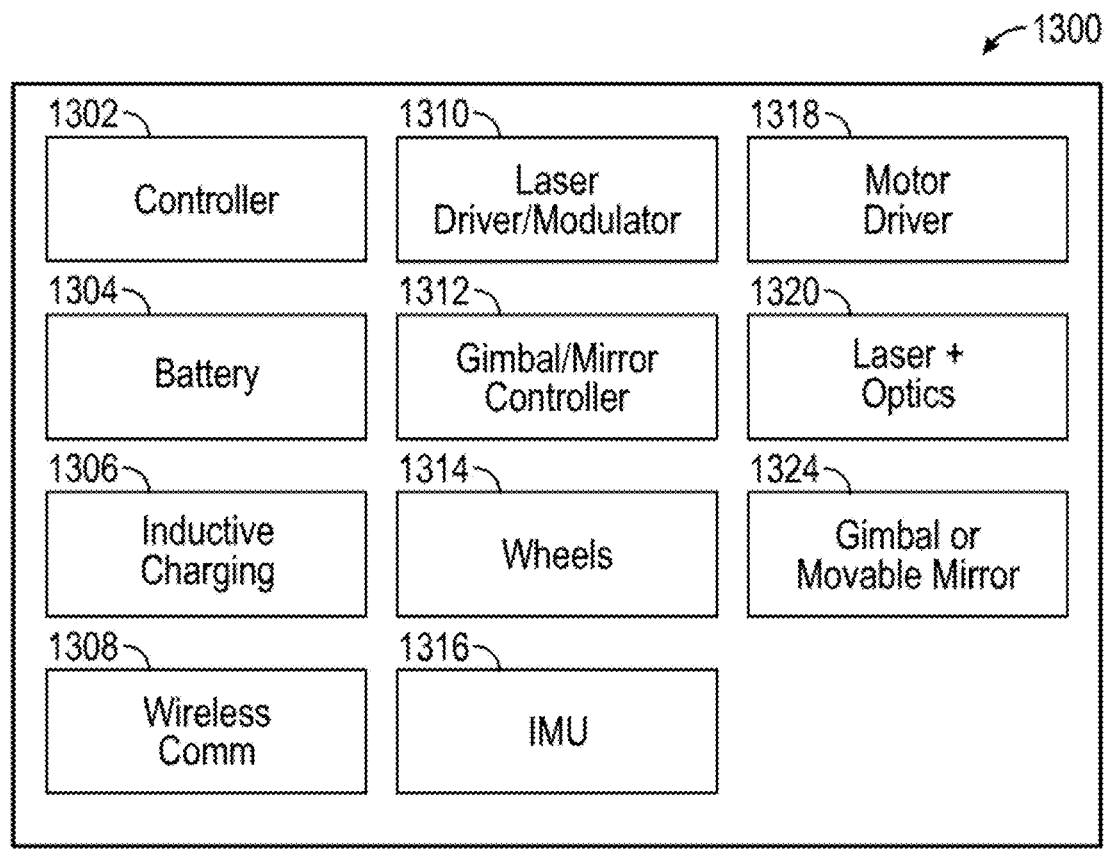
FIG. 24 shows various components of a roaming and articulating unit adapted to deliver optical power to charge a target device, in accordance with one exemplary embodiment of the present invention.

FIG. 24 shows various components of a RAGU adapted to deliver optical power, in accordance with one exemplary embodiment of the present invention. RAGU 1300 is shown as including controller 1302, battery 1304, an inductive charging unit 1306, a wireless communication unit 1308, laser driver/modulator 1310, gimbal/mirror controller 1312, wheels 1314, inertia measurement unit (IMU) 1316, motor driver 1318, laser and associated optics 1320, and gimbal/movable mirror 1324. It is understood that other embodiments of a RAGU may have fewer or more components than those shown in FIG. 24. For example, the IMU, and the inductive charging may not be present in some embodiments. Movable mirrors and mirror controllers may not be present when the RAGU is adapted to align the light beam through its motions/rotations.

It is understood that because coherence is not a requirement when using a light beam to power a device, the light beam may be supplied by any suitable source of light and is not limited to a laser source. By using mirrors, lenses and other optical components, the light from a non-coherent source may also be transformed into a beam suitable for wireless power transfer.

In some embodiments, one or more RAGUs may operate in coordination with one or more RAPUs to power a device using light. Such RAPUs include mirrors or refractors positioned to redirect and reorganize the light beam. RAPUs are advantageously used in many situations by providing a pathway from a GU that is blocked or otherwise obstructed by other objects.

Figure 25:
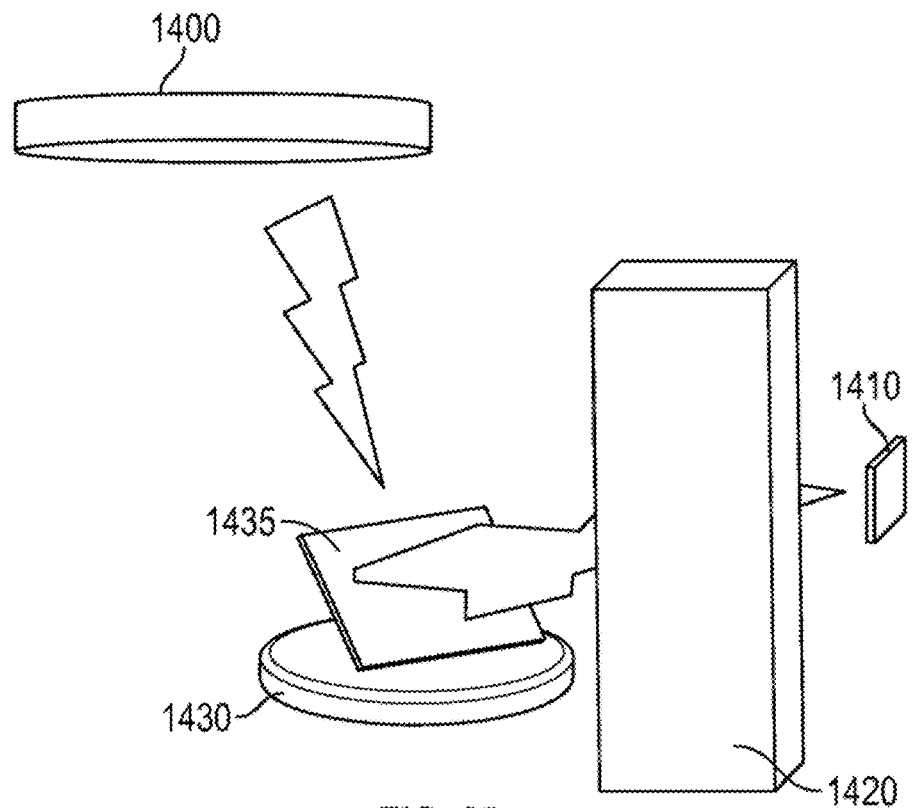
FIG. 25 shows a roaming and articulating unit operating in concert with a roaming and articulating passive unit to deliver an optical beam to a target device.

FIG. 25 shows a GU 1400 attempting to wirelessly power RU 1410. GU 1400 is a stationary unit assumed to be mounted on, for example, a ceiling. The path of the light beam power from GU 1400 to RU 1410 is shown as being blocked by object 1420. To effectuate the optical light delivery, RAPU 1430 moves into a new position, as shown, so that the light generated by GU 1400 and reflected by the reflector 1435 of the RAPU reaches target RU 1410. In yet other embodiments, a RAGU may use stationary mirrors to reach otherwise obstructed or difficult or cumbersome places where a target device may be positioned.

One or more RAGUs and/or RAPUs may operate in concert in a variety of ways. A distributed processing or a central processing system may be used to control the movement and operations of multiple RAGUs and/or RAPUs. A central processing system may be used, for example, in situations requiring large amounts of computation, such as imaging.

A RAGU may include the ability to monitor its own energy status and locate and identify various power sources, such as a docking station, an inductive charging pad, or wall outlet. In some embodiments, a RAGU uses, for example, camera or other sensors to identify a power outlet. A RAGU may include a self-articulating arm adapted to plug the RAGU to the outlet. An inductive charging may be included in part or all of the floor of a house/office/store to enable the RAGU to charge itself, thereby enabling the RAGU to have a smaller battery and overall size. A RAGU may be adapted to find a docking station by following a beacon (optical, ultrasonic, or RF) that is transmitted by the docking station. In another embodiment, the docking station responds to a beacon transmitted by the RAGU to guide the RAGU in finding the docking station. Other sensors such as IMUs and navigation mechanisms such as GPS, WiFi, and the like, may also be used to guide the RAGU in finding the docking station or the devices that need to be charged.

Figure 26:
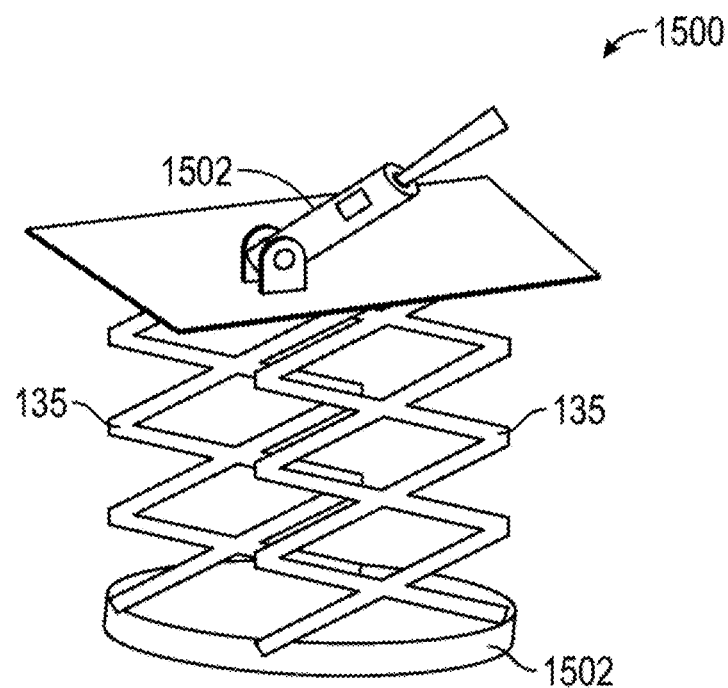
FIG. 26 shows a roaming and articulating unit that includes a crisscrossing scissors adapted to raise the elevation of an optical assembly mounted thereon, in accordance with one embodiment of the present invention.
Figure 27:
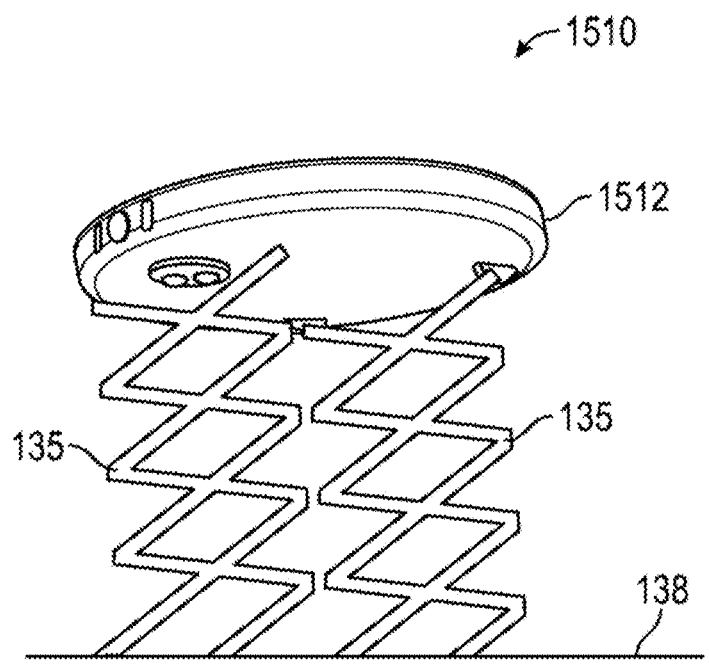
FIG. 27 shows a roaming and articulating unit that includes a crisscrossing scissors adapted to lift the roaming and articulating unit to a desired elevation, in accordance with one embodiment of the present invention.

In addition to translational and rotational motion, a RAGU may have an articulation mechanism adapted to lift, reorient and tilt the optical delivery system. FIG. 26 shows a RAGU 1500 that includes a crisscrossing scissors 135 adapted to raise optical delivery system 1502 from base 1502 and thereby enhance its reach. Crisscrossing scissors 135 may also change the orientation and tilt of the optical system. In yet other embodiments, as shown in FIG. 27, a RAGU 1510 may be lifted off the floor 138 in its entirety using crisscrossing scissors 135, or using any other lift mechanism. It is understood that the optical delivery system adapted to charge a target using light and mounted on base 1512 of RAGU 1510 is not visible in FIG. 27.

In accordance with one aspect of the present invention, a recovery device/unit adapted to be charge via light may be a RARU. A RARU can thus reposition and reorient itself to maximize power receipt and recovery. A RARU, for example, may be incorporated on wall mounted remotely powered devices and adjust the angle of its receive photovoltaic cell array based on the height that the device is mounted on the wall or the minimum distance that a RAGU can approach the RARU.

To position itself for maximum power delivery, in one exemplary embodiment, the RAGU delivers an optical beam to the target device from a first location multiple times, with each such transmission occurring after the RAGU rotates a certain amount. After each such rotation and transmission, the RAGU waits to receive, from the target device, information representative of the amount of the optical power recovered by the target device. Accordingly, the RAGU is aware of the amount of power recovered by the target device for each amount of rotation at the first location. The RAGU then moves to a second location to be closer to the target device along the angular rotation that provides the maximum power delivery to the target device. The RAGU then repeats the process of transmitting optical power to the target device from the second location multiple times, each time after rotating a certain amount and receiving, from the target device, information representative of the amount of the optical power recovered by the target device. The RAGU then moves toward the target device along the angular rotation that provides the maximum optical power delivery to the target device from the second direction. The RAGU continues to repeat the process of transmitting power, rotating in place, receiving information indicative of the level of received optical power back from the device, and determining the best direction to move toward until it finds a desirable location for optical power delivery. In one embodiment, the travel distance of the RAGU between each two successive locations is determined by the relative amount of optical power recovered (or received) by the target device. For example, when the power received by the device is relatively low, the RAGU travels a relatively longer distance. Conversely, when the power received by the device is relatively high, the RAGU travels a relatively shorter distance.

In accordance with another exemplary embodiment, to find a suitable location for powering a target device, the RAGU transmits optical power to the target device from an initial location multiple times with each such transmission occurring after the RAGU rotates a certain amount. After each such rotation and transmission, the RAGU waits to receive, from the target device, information representative of the amount of the optical power recovered by the device. The RAGU then moves to a second location along a direction that is different from that providing the maximum power. While at the second location, the RAGU transmits power to the target device multiple times with each such transmission occurring after the RAGU rotates a certain amount. After each such rotation and transmission from the second location, the RAGU waits to receive, from the target device, information representative of the amount of the optical power recovered by the device. Armed with the knowledge of the two different angles from two different locations that result in maximum optical power deliveries, the RAGU approximates the optimum location of the target device using a trilateration algorithm and moves to this optimum location for powering the device. The trilateration algorithm may also be performed when multiple RAGUs that are in communication with one another are used to wirelessly charge a device in a shorter time period.

Figure 28B:
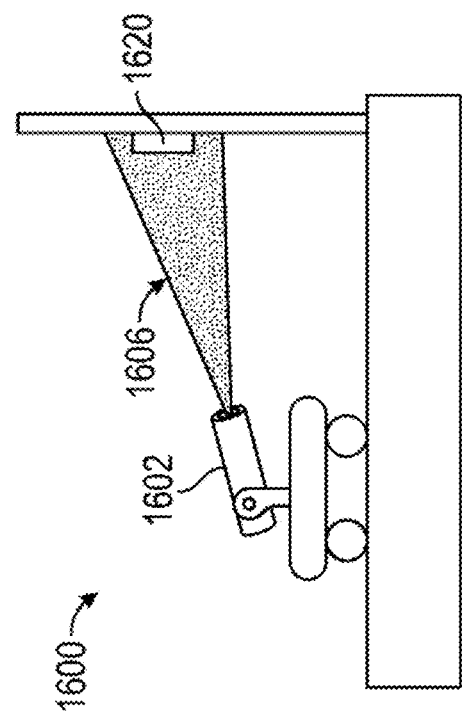
FIG. 28B shows the roaming and articulating unit of FIG. 28 after the optical beam of the optical assembly is controlled to deliver a relatively narrower beam focused on the target device, in accordance with one embodiment of the present invention.
Figure 28A:
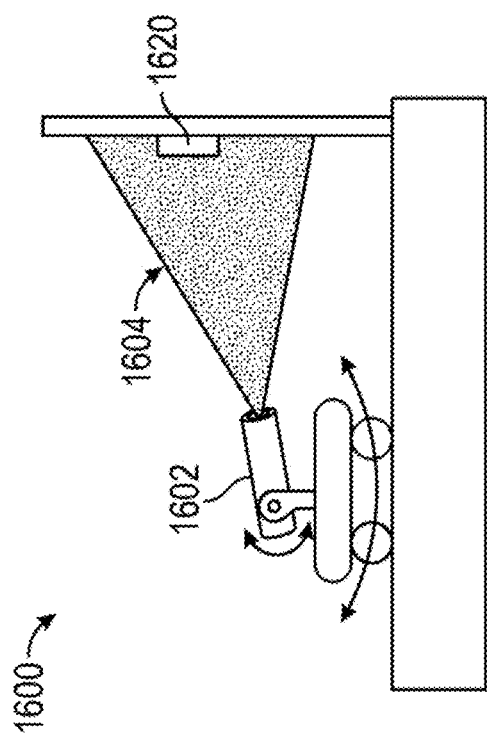
FIG. 28A shows a roaming and articulating unit having mounted thereon an optical assembly that is controlled to deliver a relatively wide optical beam to a target device, in accordance with one embodiment of the present invention.

In order to expedite position determination of an RU, in some embodiments the width of the optical beam delivered by the optical delivery system disposed on the RAGU is dynamically adjusted. A narrow, collimated beam results in a relatively small spot and as the beam is swept around, no guiding information is available until the beam impinges on the RU. By using a wider beam during the beginning of the search, the probability of illuminating the RU increases and hence feedback can be achieved faster. Once an initial approximate position of the RU is detected, the beam may be made progressively smaller until the spot size become similar in size or smaller than the RU's photovoltaic size. FIG. 28A shows a RAGU 1600 having mounted thereon an optical beam delivery system 1602 that is shown as delivering an optical beam to RU 1620. The beam width 1604 is shown as being relative wide. In FIG. 28B, RAGU 1600 has determined an approximate position of RU 100, therefore optical beam delivery system 1602 has narrowed the beam width 1606 to achieve a better focus on RU 1620.

In some embodiments, a gradient filter or a Gaussian beam spreader may be used to further expedite location determination of the RU. Such a filter may be a fixed filter or may be dynamically adjusted via a spatial light modulator element (SLM). The gradient on such a filter provides information to the GU about the direction of the movement of the beam such that the RU becomes centered to the beam.

Figure 29:
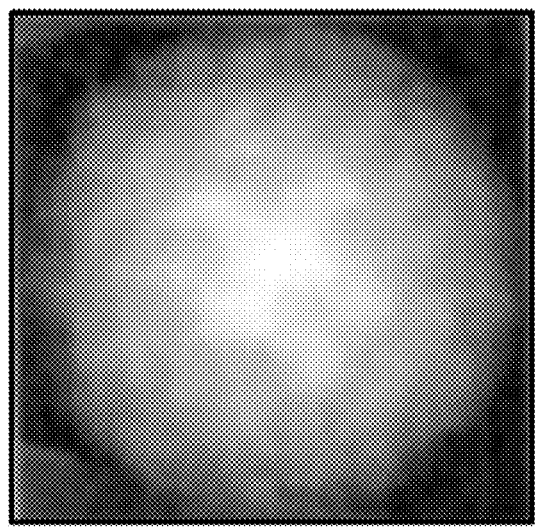
FIG. 29 shown an exemplary gradient filter used by a roaming and articulating unit to determine the location of a target device, in accordance with one exemplary embodiment of the present invention.

FIG. 29 shows an embodiment of such a filter. As shown, the center of the filter is fully transparent and may have a hole. The filter becomes gradually more opaque moving away from the center. As a result, a beam projected onto the filter will have the highest intensity in the center and lowest intensity on the edges. As the GU sweeps the beam around, the RU reports back among other information, the amount of power received. A gradient ascend algorithm used by the GU can hence quickly find the direction of movement that centers the RU near the center of the beam. Once the RU is centered, the beam width can quickly narrow down to reach nearly the size of the RU without further search for location. The gradient pattern does not need to be circularly symmetric and can have any form or pattern. The light intensity may be changed by changing the opaqueness, or via small scale black and white patterns, in a manner similar to how different shades of gray are generated in single color printing.

In one embodiment a wireless communication link (such as RF, acoustics, or infrared) may be used between the RU and GU. The RU may use the communication link to report data regarding the received optical power back to the GU. In other embodiments, the RU utilizes reflective surfaces (such as reflective paint) around the photovoltaic cells. In such an embodiment, the GU utilizes a light receiver (such as photodiode or camera) to sense the reflection and guide the light beam. If a camera is used, the reflective surface may incorporate unique patterns (such as QR codes) that can be used to identify the RU or distinguish the RU from other reflective surfaces.

In some embodiments, a RAGU with optical beam delivery system uses the information it receives from its Doppler radar as well as information it receives from other sensors, such as cameras, LIDAR, ultrasound, bump sensors, odometers, and the like, to map the locations within which it is charging devices. By comparing the mapping data the RAGU generates from each trip around a confined area to the mapping data from previous trips, the RAGU over time builds a highly accurate and advanced model of the walls, chairs, toys, doors, and the like, of the area in which it operates. This, in turn, enables a RAGU to reach known devices efficiently and locate an optimal position for maximum power transfer to each such device.

Figure 30:
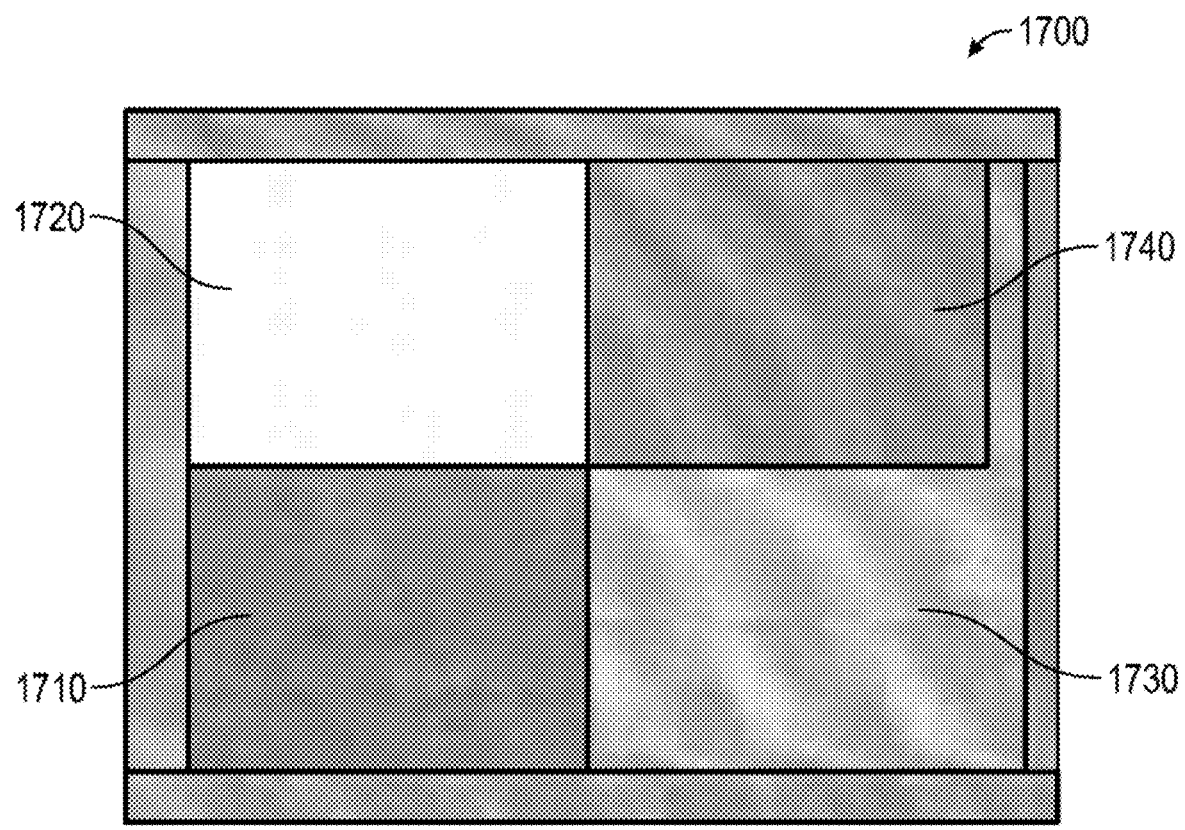
FIG. 30 show a color/shade coded tag with recognizable patterns that may be disposed on an RU so as to guide a roaming and articulating unit to locate the RU, in accordance with one embodiment of the present invention.

In some embodiment, the homing of the RAGU onto the RU may be enhanced through various mechanisms, such a predetermine pattern and/or color/shading (black and white, gray scale, and/or color), that can be identified by a camera or other visual imaging devices that may be present on a RAGU. Such mechanisms may also be used to find the distance and orientation of the RU with respect to the RAGU. The RAGU can use its camera to find the RUs in various rooms using, for example, unique identifying patterns printed on the RUs or on a label disposed on the RUs. The RAGU's camera while scanning the room will recognize these patterns and uses them to find the location and distance of the RU to RAGU. For example, the size of a recognized pattern is a representation of distance and where the pattern is detected on the image captured by the camera is a representation of its location. Furthermore, the camera may be used in navigation to create a map of objects around the RU. FIG. 30 shows a tag 1700 (for disposition on an RU) that includes 4 regions 1710, 1720, 1730 and 170 each with a different shade of gray. Each such region may further include patterns/markers that are readily identifiable by an image acquisition device disposed on a RAGU to help guide the RAGU toward the RU. Therefore, a RAGU may use both the shading of different regions as well as the patterns/markers on the tag to guide its movement toward the RU.

In accordance with one aspect of the present invention, a RAGU with an optical beam delivery system may be controlled through a smartphone application. The application, among other things, enables a user, for example, to as-sign priorities according to which target devices are to be charged, and/or provide instructions to the RAGU about when to operate and when not operate in certain areas of the user's home/office/store. For example, a user may instruct the RAGU not to charge devices in the living room and kitchen before 10 PM, or may instruct the RAGU not to operate in the living room the coming weekend because a friend will be sleeping on the couch. This enable the users to keep track of their devices and the RAGUs when they are away from their homes or are out of town.

Through the application, a user may also inform the RAGU about the place in which the RAGU is operating, such as home, office, and the like. For example, a user may decide to take his/her RAGU to office during the day and back to home at night. The application enables a user to achieve this so that the RAGU knows of its whereabouts, and thus can use its previously stored mapping data to charge devices.

A RAGU, in accordance with embodiments of the present invention, is also adapted to keep track of how often it charges each device and communicates this information to the user via the application. For example, if a smoke detector that was previously requesting to be charged by a RAGU every 6 months, changes to making this request every 6 weeks, its battery may need to be replaced. By recording such data and reporting it to the user via the application, the user becomes aware that the smoke detector battery possibly needs to be replaced.

In one embodiment, a RAGU with an optical beam delivery system may be disposed on an airborne vehicle, such as a balloon, drone, and the like. In other embodiments, a GU may be mounted on an airborne vehicle and use its internal battery, or the battery of the airborne device, which may be photovoltaic cells covering the surfaces of the airborne vehicle, to power target devices wirelessly. Such embodiments are adapted to provide power to any flying or stationary device. In another embodiment, the GU may be mounted on the surface of a submarine and harvest the mechanical energy of the waves to power its movement.

The above embodiments of the present invention are illustrative and not limitative. Embodiments of the present invention are not limited by the type of device that may be wirelessly charged. Other additions, subtractions or modifications are obvious in view of the present disclosure and are intended to fall within the scope of the appended claims.

What is claimed is:

1. A roaming and articulating power generation unit (RAGU) comprising:
   an optical assembly adapted to deliver an optical beam;
   an energy storage unit;
   a controller;
   an electrically driven moving platform; and
   an indoor positioning system.

2. The RAGU of claim 1 wherein the optical assembly comprises a laser.

3. The RAGU of claim 2 wherein the optical assembly comprises a lens.

4. The RAGU of claim 3 wherein a position of said lens may be changed along an optical axis relative to a fixed position of the laser.

5. The RAGU of claim 2 wherein a position of said laser may be changed along an optical axis relative to a fixed position of the lens.

6. The RAGU of claim 1 wherein said optical assembly is adapted to change its angle relative to a plane of a surface on which the RAGU is positioned.

7. The RAGU of claim 1 wherein said optical assembly is adapted to rotate about the z axis.

8. The RAGU of claim 1 wherein said optical assembly is adapted to change its height along the z axis.

9. The RAGU of claim 1 wherein the moving platform comprises an inertia measurement unit to facilitate navigation.

10. The RAGU of claim 1 wherein the moving platform comprises a GPS to facilitate navigation.

11. The RAGU of claim 1 wherein the RAGU further comprises a camera.

12. The RAGU of claim 1 wherein the RAGU further comprises a wireless communication link.

13. The RAGU of claim 1 wherein the energy storage unit is a rechargeable battery.

14. The RAGU of claim 1 further comprising at least one motor adapted to change elevation and azimuth angle of the optical assembly.

15. A roaming and articulating power generation unit (RAGU) comprising:
    an optical assembly adapted to deliver an optical beam;
    an energy storage unit;
    a controller; and
    an electrically driven moving platform, wherein the RAGU is adapted to navigate and select an elevation height and angle of the optical assembly to deliver maximum power to a recovery unit.

16. The RAGU of claim 15 wherein the RAGU is adapted to navigate to a location from which the optical assembly delivers the maximum power to the recovery unit.

17. The RAGU of claim 1 where the controller is adapted to vary beam width of the optical assembly.

18. The RAGU of claim 1 wherein the optical assembly further comprises a gradient filter.

19. The RAGU of claim 1 wherein the optical assembly further comprises a Gaussian beam spreader.

20. The RAGU of claim 1 further comprising a LIDAR.

21. The RAGU of claim 1 wherein said indoor positioning system uses a Bluetooth signal for indoor position determination.

22. The RAGU of claim 1 wherein said indoor positioning system uses a WiFi signal for indoor position determination.

* * * * *